US005844032A

United States Patent [19]
Serrano et al.

[11] Patent Number: 5,844,032
[45] Date of Patent: Dec. 1, 1998

[54] INTERCALATES AND EXFOLIATES FORMED WITH NON-EVOH MONOMERS, OLIGOMERS AND POLYMERS; AND EVOH COMPOSITE MATERIALS CONTAINING SAME

[75] Inventors: Fernando Serrano, Chicago; Steven J. Engman, Skokie; Gary W. Beall, McHenry, all of Ill.

[73] Assignee: Amcol International Corporation, Arlington Heights, Ill.

[21] Appl. No.: 761,444

[22] Filed: Dec. 6, 1996

Related U.S. Application Data

[63] Continuation-in-part of Ser. No. 637,092, May 2, 1996, Pat. No. 5,760,121, which is a continuation-in-part of Ser. No. 525,416, Sep. 8, 1995, Pat. No. 5,721,306, and a continuation-in-part of Ser. No. 488,264, Jun. 7, 1995, Pat. No. 5,552,469, and a continuation-in-part of Ser. No. 488,263, Jun. 7, 1995, Pat. No. 5,698,624, said Ser. No. 525,416, Sep. 8, 1995, Continuation-in-part of Ser. No. 488,264, Jun. 7, 1995, Pat. No. 5,552,469, and a continuation-in-part of Ser. No. 488,263, Jun. 7, 1995, and a continuation-in-part of Ser. No. 480,080, Jun. 7, 1995, Pat. No. 5,578,672.

[51] Int. Cl.$^6$ .................................................. C08K 3/34
[52] U.S. Cl. ........................................ 524/445; 524/449
[58] Field of Search ..................................... 524/449, 445

[56] References Cited

U.S. PATENT DOCUMENTS

| | | | |
|---|---|---|---|
| 2,035,546 | 3/1936 | Hamilton | 167/24 |
| 3,419,460 | 12/1968 | Ure | 161/162 |
| 3,419,517 | 12/1968 | Hedrick et al. | 260/37 |
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 4,125,411 | 11/1978 | Lyons | 106/291 |
| 4,210,572 | 7/1980 | Herman et al. | 260/404 |
| 4,251,576 | 2/1981 | Osborn et al. | 428/331 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield | 523/216 |
| 5,667,886 | 9/1997 | Gough | 428/331 |

FOREIGN PATENT DOCUMENTS

| | | |
|---|---|---|
| 0 205 281 A3 | 12/1986 | European Pat. Off. . |
| 0 335 653 A1 | 10/1989 | European Pat. Off. . |
| 0 358 415 A1 | 3/1990 | European Pat. Off. . |
| 0 479 031 A1 | 4/1992 | European Pat. Off. . |
| 0 548 940 A1 | 6/1993 | European Pat. Off. . |
| 0 645 181 A2 | 3/1995 | European Pat. Off. . |
| 0 761 739 A1 | 3/1997 | European Pat. Off. . |
| 1 642 122 | 7/1970 | Germany . |
| 1146668 | 3/1969 | United Kingdom . |
| 1 565 362 | 4/1980 | United Kingdom . |
| WO 93/04117 | 3/1993 | WIPO . |
| WO 93/04118 | 3/1993 | WIPO . |

OTHER PUBLICATIONS

Sanchez Camazano, M. et al., "Factors influencing interactions of organophosphorus pesticides with montmorillonite", *Chemical Abstracts*, vol. 98, No. 19, 9 May 1983, Columbus, Ohio, US, Abstract No. 156367.

Bujdak, et al., "The reaction of montmorillonite with octadecylamine in solid and melted state", Chemical Abstracts, vol. 118, No. 26, Abstract No. 257609b, p. 166 (28 Jun. 1993), Columbus, Ohio (US).

Yano, et al., "Synthesis And Properties Of Polyimide–Clay Hybrid", Polymer Preprints, ACS, Apr. 1991, pp. 65–66.

(List continued on next page.)

*Primary Examiner*—Paul R. Michl
*Attorney, Agent, or Firm*—Marshall, O'Toole, Gerstein, Murray & Borun

[57] ABSTRACT

Nanocomposites are manufactured by combining an EVOH matrix polymer and exfoliated intercalates formed by contacting a phyllosilicate with a non-EVOH intercalant to adsorb or intercalate the intercalant between adjacent phyllosilicate platelets. Sufficient intercalant is adsorbed between adjacent phyllosilicate platelets to expand the adjacent platelets to a spacing of at least about 5 Å, preferably at least about 10 Å (as measured after water removal), up to about 100 Å and preferably in the range of about 30–40 Å, so that the intercalate easily can be exfoliated, e.g., when mixed with the EVOH matrix polymer melt, to provide an EVOH matrix polymer/platelet composite (nanocomposite) material that does not degrade the EVOH matrix polymer.

29 Claims, 20 Drawing Sheets

OTHER PUBLICATIONS

Giannelis, et al., "Synthesis And Processing Of Ceramics: Scientific Issues", Materials Research Society Symposium Proceedings, vol. 249 (1992), pp. 547–558.

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations and Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide)in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al. Swelling Behavior Of Montmorillonite Cation Exchanged For ω–Amino Acids By ∈–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan,* International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science,* vol. 7, 1989 Tokyo, Japan, pp. 243–251.

Wu, et al., "Structural, thermal, and electrical characterization of layered nanocomposites derived from sodium–montmorillonite and polyethers", *Chemical Abstracts,* vol. 119, No. 4, Jul. 26, 1993 Columbus, Ohio, US, Abstract No. 31017r.

|  | DTG | mG/S |  | DTG | mG/S |
|---|---|---|---|---|---|
| STEP | | | STEP | | |
| START TEMP. °C | | 36.7 | START TEMP. °C | | 343.3 |
| PEAK TEMP. °C | | 233.3 | PEAK TEMP. °C | | 356.7 |
| END TEMP. °C | | 273.3 | END TEMP. °C | | 388.3 |
| Δm mG | | -1.8990 | Δm mG | | -3.6340 |
| Δm % | | -7.3943 | Δm % | | -14.150 |
| STEP | | | STEP | | |
| START TEMP. °C | | 273.3 | START TEMP. °C | | 388.3 |
| PEAK TEMP. °C | | 320.0 | PEAK TEMP. °C | | 471.7 |
| END TEMP. °C | | 343.3 | END TEMP. °C | | 690.0 |
| Δm mG | | -6.3920 | Δm mG | | -11.282 |
| Δm % | | -24.889 | Δm % | | -43.930 |
| | | | RESIDUE | | |
| | | | TEMPERATURE °C | | 795.3 |
| | | | Δm mG | | 2.3670 |
| | | | Δm % | | 9.2166  9.2% CLAY |

|  | DTG mG/S |  | DTG mG/S |
|---|---|---|---|
| STEP | | STEP | |
| START TEMP. °C | 46.7 | START TEMP. °C | 428.3 |
| PEAK TEMP. °C | 168.3 | PEAK TEMP. °C | 460.0 |
| END TEMP. °C | 225.0 | END TEMP. °C | 768.3 |
| Δm   mG | -1.8760 | Δm   mG | -4.4780 |
| Δm   % | -5.4968 | Δm   % | -13.121 |
| STEP | | RESIDUE | |
| START TEMP. °C | 225.0 | TEMPERATURE °C | 795.7 |
| PEAK TEMP. °C | 366.7 | Δm   mG | 1.3850 |
| END TEMP. °C | 428.3 | Δm   % | 4.0581   4.29% CLAY |
| Δm   mG | -26.392 | | |
| Δm   % | -77.330 | | |

INTERCALATES AND EXFOLIATES FORMED WITH NON-EVOH MONOMERS, OLIGOMERS AND POLYMERS; AND EVOH COMPOSITE MATERIALS CONTAINING SAME

CROSS-REFERENCE TO RELATED APPLICATION

This application is a continuation-in-part of U.S. patent application Ser. No. 08/637,092 filed May 2, 1996, now U.S. Pat. No. 5,760,121 which is a continuation-in-part of U.S. patent application Ser. No. 08/525,416, filed Sep. 8, 1995 now U.S. Pat. No. 5,721,306; Ser. No. 08/488,264 filed Jun. 7, 1995, now U.S. Pat. No. 5,552,469; and Ser. No. 08/488,263 filed Jun. 7, 1995 now U.S. Pat. No. 5,698,624. U.S. patent application Ser. No. 08/525,416 is a continuation-in-part of U.S. patent application Ser. No. 08/488,264 filed Jun. 7, 1995; Ser. No. 08/488,263 filed Jun. 7, 1995 and Ser. No. 08/480,080 filed Jun. 7, 1995, now U.S. Pat. No. 5,578,672.

FIELD OF THE INVENTION

The present invention is directed to composite materials that are mixtures of intercalated layered materials, and/or exfoliates thereof, and EVOH matrix polymers. The intercalated layered materials are manufactured by sorption (adsorption and/or absorption) of one or more non-EVOH monomers, oligomers or polymers between planar layers of a swellable layered material, such as a phyllosilicate or other layered material, to expand the interlayer spacing of adjacent layers to at least about 5 Å. More particularly, intercalates have at least two layers of non-EVOH monomer, oligomer and/or polymer molecules sorbed on the internal surfaces of adjacent layers of the planar platelets of a layered material, such as a phyllosilicate, preferably a smectite clay, to expand the interlayer spacing to at least about 5 Angstroms, preferably at least about 10 Angstroms, more preferably to at least about 20 Angstroms, and most preferably to at least about 30–45 Angstroms, up to about 100 Å, or disappearance of periodicity. The resulting intercalates are neither entirely organophilic nor entirely hydrophilic, but a combination of the two, and easily can be exfoliated for or during admixture with an EVOH matrix polymer melt, without degrading the EVOH polymer. The resulting EVOH matrix polymer/platelet composite materials are useful wherever EVOH polymer/filler composite materials are used, particularly for providing gas barriers, e.g., as films useful in food wrap having improved gas impermeability; food grade drink containers; automotive gas tank liners; and any other use wherein it is desired to alter one or more physical properties of an EVOH matrix polymer, such as elasticity, temperature, and gas-impermeability characteristics.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, thereby substantially increasing the interlayer (interlaminar) spacing between the adjacent silicate layers. The thus-treated, intercalated phyllosilicates then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary of such prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is *Synthesis and Properties of Two-Dimensional Nanostructures by Direct Intercalation of Polymer Melts in Layered Silicates*, Richard A. Vaia, et al., Chem. Mater., 5:1694–1696(1993). Also as disclosed in Adv. Materials, 7, No. 2:(1985), pp, 154–156, *New Polymer Electrolyte Nanocomposites: Melt Intercalation of Poly(Ethylene Oxide) in Mica-Type Silicates*, Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate polyvinylpyrrolidone (PVP), polyvinyl alcohol (PVOH) and poly (ethylene oxide) (PEO) between montmorillonite clay platelets with little success. As described in Levy, et al., *Interlayer Adsorption of Polyvinylpyrrolidone on Montmorillonite,* Journal of Colloid and Interface Science, Vol. 50, No. 3, Mar. 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 Å). Only the sodium montmorillonite had expanded beyond a 20 Å basal spacing (e.g., 26 Å and 32 Å), at $5^+$% $H_2O$, after contact with the PVP/ethanol/$H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, *Adsorption of Polyvinyl Alcohols by Montmorillonite*, Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVOH). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of an intercalant into layered materials would be exceptionally costly in drying the intercalated layered materials for separation of intercalate from the polymer carrier, e.g., water, and, therefore, apparently no further work was accomplished toward commercialization.

SUMMARY OF THE INVENTION

This assignee's U.S. Pat. No. 5,552,469, hereby incorporated by reference, describes intercalation of layered silicate materials by contact with a water-soluble polymer, or polymerizable monomers that polymerize while intercalated to form water-soluble polymers, such as polyvinylpyrrolidone or polyvinyl alcohol. U.S. Pat. No. 5,552,469 discloses mixtures of such intercalates, and/or exfoliates thereof, with various matrix polymers to improve one or more properties of the matrix polymers. One of the intercalant polymers disclosed useful in U.S. Pat. No. 5,552,469 is an ethylene/vinyl alcohol (EVOH) copolymer. It was envisioned at the time of filing the application leading to U.S. Pat. No. 5,552,469, that good composite materials, based on EVOH matrix polymers, could be manufactured by intercalating a layered silicate material, such as a phyllosilicate, with EVOH monomers, oligomers or polymers, and then adding the intercalate and/or exfoliate thereof to an EVOH matrix polymer. Surprisingly, it was found that layered silicate materials that contain sodium ions in the interlayer spaces, e.g., a sodium montmorillonite or sodium bentonite, degrades the EVOH polymer that is complexed to the inner platelet surfaces of the layered silicate material—thereby substantially lowering one or more physical properties (e.g., gas-impermeability) of the EVOH-based composite material.

In accordance with the principles of the present invention, it has been found that in order to provide a composite material containing an EVOH matrix polymer, the intercalate, and/or exfoliate thereof, should be formed by intercalating the layered silicate material with a non-EVOH intercalant material (monomer, oligomer or polymer) to complex the non-EVOH intercalant to the platelet surfaces, thereby covering the sodium ions on the inner surfaces of the platelets with the non-EVOH intercalant and shielding the EVOH matrix polymer from the EVOH—degrading $Na^+$ ions. It has been found that EVOH matrix polymers are not degraded by the addition of an intercalate or exfoliate thereof, so long as the $Na^+$-containing platelet surfaces of the intercalate, or exfoliate of the layered silicate material, are complexed with a non-EVOH monomer, oligomer or polymer intercalant. Preferred intercalants are water-soluble polymers selected from the group consisting of polyvinylpyrrolidone (PVP); polyvinyl alcohol (PVOH); copolymers of vinyl acetate and vinyl pyrrolidone; and mixtures thereof.

Best results are achieved using an intercalant that is a monomer, an oligomer (herein defined as a pre-polymer having 2 to about 15 recurring monomeric units, which can be the same or different) or a polymer (herein defined as having more than about 15 recurring monomeric units, which can be the same or different) composition for intercalation having at least about 2%, preferably at least about 5% by weight intercalant monomer, intercalant oligomer or intercalant polymer concentration, more preferably about 50% to about 80% by weight intercalant, based on the weight of intercalant and carrier (e.g., water and/or other solvent for the intercalant) to achieve better sorption of the intercalant between phyllosilicate platelets. The non-EVOH intercalant is sorbed between and complexed to the silicate platelets and causes separation or added spacing between adjacent silicate platelets and, for simplicity of description, the monomer, oligomer and/or polymer intercalants are hereinafter called the "intercalant", "monomer intercalant", "intercalant monomer", "intercalant polymer", or "polymer intercalant". In this manner, water-soluble or water-insoluble monomers, oligomers or polymers will be sorbed sufficiently to increase the interlayer spacing of the phyllosilicate in the range of about 5 Å to about 100 Å, for easier and more complete exfoliation, in a commercially viable process, regardless of the particular phyllosilicate or intercalant polymer.

In accordance with an important feature of the present invention, best results are achieved using a water-soluble or water-insoluble monomer, oligomer (herein defined as a pre-polymer having 2 to about 15 recurring monomeric units, which can be the same or different) or polymer (herein defined as having more than about 15 recurring monomeric units, which can be the same or different) composition for intercalation having at least about 2%, preferably at least about 5% by weight, more preferably at least about 10% by weight intercalant concentration, most preferably about 30% to about 80% by weight intercalant, based on the weight of intercalant and carrier (e.g., water with or without another solvent for the intercalant) to achieve better sorption of the intercalant between phyllosilicate platelets. Regardless of the concentration of intercalant in liquid solvent of the intercalating composition, the intercalating composition should have an intercalant:layered material ratio of at least 1:20, preferably at least 1:10, more preferably at least 1:5, and most preferably about 1:4 to achieve efficient intercalation of the intercalant between adjacent platelets of the layered material. The intercalant sorbed between and permanently bonded or complexed to the silicate platelets causes separation or added spacing between adjacent silicate platelets and, for simplicity of description, the monomers, oligomers and polymers are hereinafter called the "intercalant". In this manner, the intercalants will be sorbed sufficiently to increase the interlayer spacing of the phyllosilicate in the range of about 5 Å to about 100 Å, preferably at least about 10 Å, for easier and more complete exfoliation, in a commercially viable process, regardless of the particular phyllosilicate or intercalant.

A phyllosilicate, such as a smectite clay, can be intercalated sufficiently for subsequent exfoliation by sorption of monomers, polymers or oligomers that have a carbonyl, hydroxyl, carboxyl, amine, amide, ether, ester, sulfate, sulfonate, sulfinate, sulfamate, phosphate, phosphonate, phosphinate functionality, or aromatic rings, including lactams, lactones, anhydrides, nitriles, n-alkyl halides, pyridines, or otherwise have a dipole moment greater than the dipole moment of water (1.85 D) to provide complexing or bonding of the intercalant to the inner platelet surfaces by a mechanism selected from the group consisting of ionic complexing; electrostatic complexing; chelation; hydrogen bonding; ion-dipole; dipole/dipole; Van Der Waals forces; and any combination thereof, between two functional groups of one or two intercalant molecules and the metal cations bonded to the inner surfaces of the phyllosilicate platelets. Sorption and metal cation electrostatic attraction or bonding of a platelet metal cation between two oxygen, sulfur, phosphorous, nitrogen or halogen atoms of the intercalant molecules; or the electrostatic bonding between the interlayer cations in hexagonal or pseudohexagonal rings of the smectite layers and an intercalant aromatic ring structure increases the interlayer spacing between adjacent silicate platelets or other layered material to at least about 5 Å, preferably at least about 10 Å, and more preferably at least about 20 Å, and most preferably in the range of about 30 Å to about 45 Å. Such intercalated phyllosilicates easily can be exfoliated into individual phyllosilicate platelets.

Depending upon the conditions that the composition is subjected to during intercalation and exfoliation, particularly temperature; pH; and amount of water contained in the intercalating composition, the intercalate and/or exfoliate/carrier composition can be formed to any desired viscosity, e.g., at least about 100 centipoises, preferably at least about 500–1000 centipoises, whether or not gelled, and particularly to extremely high viscosities of about 5,000 to about 5,000,000 centipoises. The compositions are thixotropic so that shearing will lower viscosity for easier delivery, and then by reducing shear or eliminating shear, the compositions will increase in viscosity. The intercalant intercalates between the spaces of adjacent platelets of the layered material for easy exfoliation, and complexes with the metal cations on the platelet surfaces where the polymer remains after the intercalate, or exfoliate thereof, is combined with the carrier/solvent or added to a polymer melt. It is theorized that the intercalant coating on the surfaces of the clay platelets is ionically complexed with interlayer cations and protects the Na$^+$ on the inner platelet surfaces from degrading the EVOH matrix polymer that the intercalate and/or exfoliate is added to. The intercalate or exfoliate participates (aids) in the viscosification and thixotropy of the carrier/solvent composition and adds significant strength, vapor impermeability and temperature characteristics to an EVOH matrix polymer. However, other forms of bonding such as hydrogen bonding or Van Der Waals forces or molecular complexing also may be responsible for the adherence of the intercalant to the surfaces of the layered material, either entirely, or in part.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å, and includes Na$^+$ions on the inner platelet surfaces.

"Platelets" shall mean individual layers of the Layered Material.

"Intercalate" or "Intercalated" shall mean a Layered Material that includes a monomer, oligomer and/or polymer intercalant disposed between adjacent platelets of the Layered Material to increase the interlayer spacing between the adjacent platelets to at least about 5 Å, preferably at least about 10 Å.

"Intercalation" shall mean a process for forming an Intercalate.

"Intercalant", "Intercalant Monomer" or "Intercalant Polymer" shall mean a monomer, an oligomer or a polymer that is not an EVOH copolymer, and which is sorbed between Platelets of the Layered Material and complexes with the platelet surfaces to form an Intercalate.

"Intercalating Carrier" shall mean a carrier comprising water with or without an organic solvent used together with an Intercalant to form an Intercalating Composition capable of achieving Intercalation of the Layered Material.

"Intercalating Composition" shall mean a composition comprising an Intercalant, an Intercalating Carrier for the Intercalant, and a Layered Material.

"Exfoliate" or "Exfoliated" shall mean individual platelets of an Intercalated Layered Material so that adjacent platelets of the Intercalated Layered Material can be dispersed individually throughout an EVOH matrix polymer.

"Exfoliation" shall mean a process for forming an Exfoliate from an Intercalate.

"Nanocomposite" shall mean an EVOH copolymer having dispersed therein a plurality of individual platelets obtained from an Exfoliated, Intercalated Layered Material.

"Matrix Polymer" shall mean an EVOH copolymer in which the Intercalate and/or Exfoliate is dispersed to form a Nanocomposite.

DETAILED DESCRIPTION OF THE PREFERRED EMBODIMENTS

Figure 1:
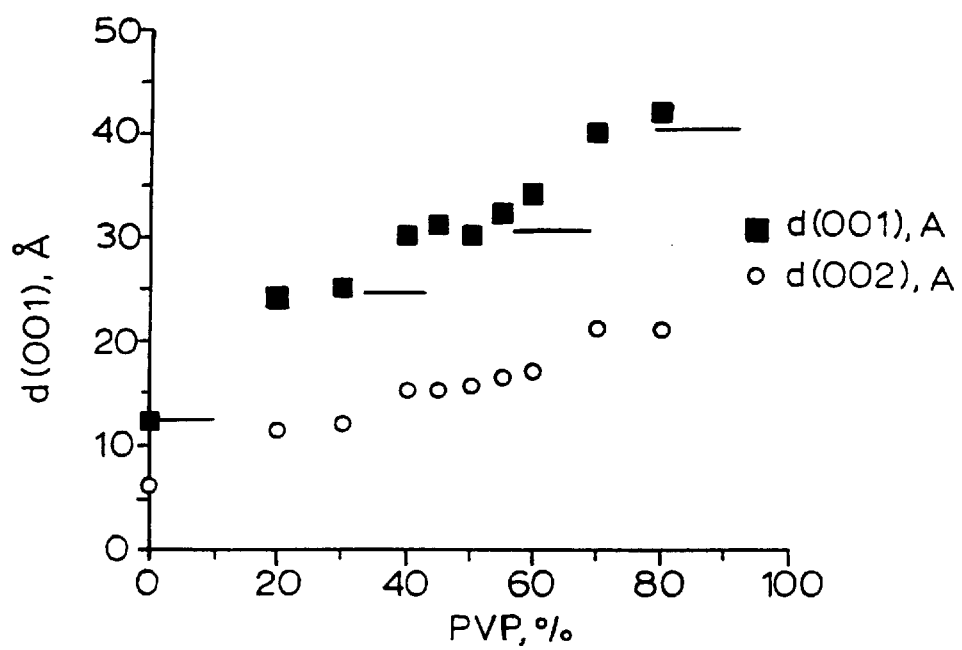
FIG. 1 is a graph plotting interlayer space for polyvinylpyrrolidone (PVP):smectite clay complexes (intercalates) showing d(001) and d(002) spacing, in Angstroms, between smectite clay platelets versus percentage of PVP sorbed, based on the dry weight of the smectite clay.

The intercalant should have an affinity for the phyllosilicate so that it is sorbed between, and is maintained associated with the silicate platelets, in the interlayer spaces, and after exfoliation. In accordance with a preferred embodiment of the present invention, the intercalant should include an aromatic ring and/or have a functionality selected from the group consisting of a carbonyl; carboxyl; hydroxyl; amine; amide; ether; ester; sulfate; sulfonate; sulfinate; sulfamate; phosphate; phosphonate; or phosphinate structure; or otherwise have a dipole moment greater than the dipole moment of water (>1.85 D) to be sufficiently bound to an inner surface of the phyllosilicate. It is hereby theorized that intercalant binding to the platelet surfaces is by metal cation electrostatic bonding or complexing, e.g., chelation, of the metal cations of the phyllosilicate sharing electrons with two carbonyl, two carboxyl, two hydroxyl, two oxygen, two amine, two $SO_x$, two $PO_x$ (wherein x=2, 3, or 4) and/or two amide functionalities of one intercalant molecule, or of two adjacent intercalant molecules to an inner surface of the phyllosilicate platelets. Such intercalants have sufficient affinity for the phyllosilicate platelets to provide sufficient interlayer spacing for exfoliation, e.g., about 5 Å–100 Å, preferably about 10 Å–50 Å, and to maintain attachment to the surfaces of the platelets, without the need for coupling agents or spacing agents, such as the onium ion or silane coupling agents disclosed in the above-mentioned prior art.

Sorption of the intercalant should be sufficient to achieve expansion of adjacent platelets of the layered material (when measured dry—having a maximum of about 5% by weight water) to an interlayer spacing of at least about 5 Å, preferably a spacing of at least about 10 Å, more preferably a spacing of at least about 20 Å, and most preferably a spacing of about 30–45 Å. To achieve intercalates that can be exfoliated easily using the preferred water-soluble polymer intercalants disclosed herein, such as polyvinylpyrrolidone, polyvinyl alcohol, copolymers of vinyl acetate and vinyl pyrrolidone and mixtures thereof, the weight ratio of intercalant to layered material, preferably a water-swellable smectite clay such as sodium bentonite, in the intercalating composition contacting the phyllosilicate should be at least about 1:20, preferably at least about 1:12 to 1:10, more preferably at least about 1:5, and most preferably about 1:5 to about 1:3. It is preferred that the concentration of intercalant in the intercalating composition, based on the total weight of intercalant plus intercalant carrier (water plus any organic liquid solvent) in the intercalating composition is at least about 15% by weight, more preferably at least about 20% by weight intercalant, for example about 20%–30% to about 90% by weight intercalant, based on the weight of intercalant plus intercalant carrier (water plus any organic solvent) in the intercalating composition during intercalation.

Figure 2:
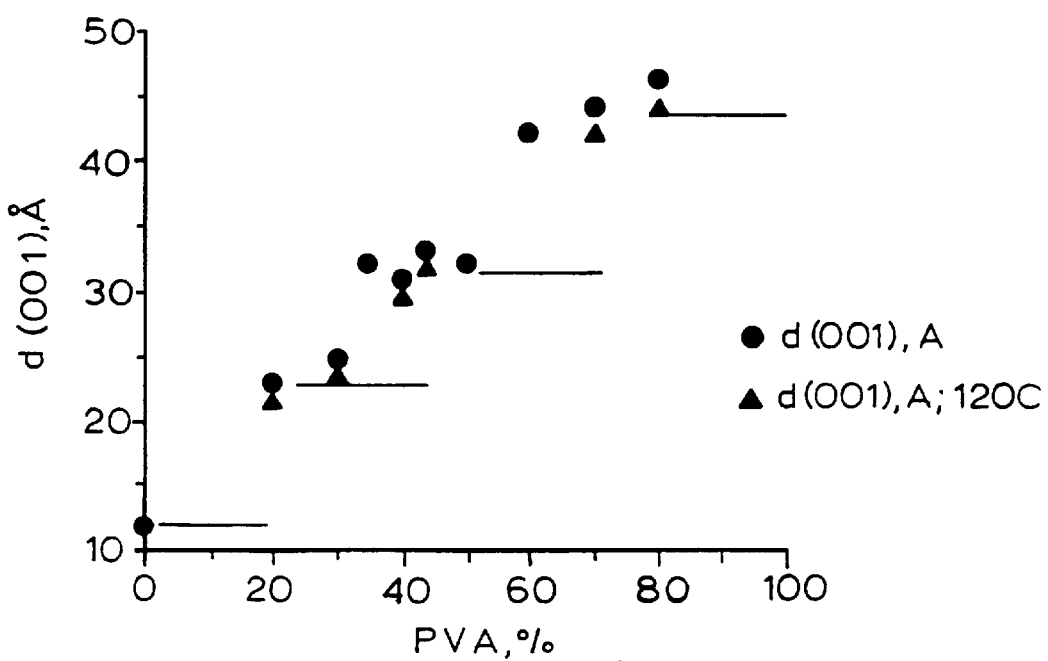
FIG. 2 is a graph plotting interlayer space for polyvinyl alcohol (PVOH):smectite clay complexes (intercalates) showing d(001) spacing, in Angstroms, between smectite clay platelets versus percentage of PVOH sorbed, based on the dry weight of the smectite clay.

It has been found that the intercalates of the present invention are increased in interlayer spacing step-wise. If the phyllosilicate is contacted with an intercalant-containing composition containing less than about 16% by weight intercalant, e.g., 10% to about 15% by weight intercalant, based on the dry weight of the phyllosilicate, a monolayer width of intercalant is sorbed (intercalated) between and complexed to the adjacent platelets of the layered material. A monolayer of intercalant intercalated between platelets increases the interlayer spacing to about 5 Å to less than 10 Å. When the amount of intercalant is in the range of about 16% to less than about 35% by weight, based on the weight of the dry layered material, the intercalant is sorbed in a bilayer, thereby increasing the interlayer spacing to about 10 Å to about 16 Å, as shown in FIGS. 1 and 2. At an intercalant loading in the intercalating composition of about 35% to less than about 55% intercalant, based on the dry weight of the layered material contacted, the interlayer spacing is increased to about 20 Å to about 25 Å, corresponding to three layers of intercalant sorbed between and complexed to adjacent platelets of the layered material, as shown in FIGS. 1 and 2. At an intercalant polymer loading of about 55% to about 80% intercalant, based on the dry weight of the layered material dissolved or dispersed in the intercalant-containing composition, the interlayer spacing will be increased to about 30 Å to about 35 Å, corresponding to 4 and 5 layers of intercalant polymer sorbed (intercalated) between and complexed to adjacent platelets of the layered material, as shown in FIGS. 1 and 2.

Such intercalates are especially useful in admixture with EVOH matrix polymers in the manufacture of polymeric articles from the polymer/platelet composite materials; particularly in the manufacture of EVOH films having increased air and oxygen impermeability; and for admixture of the intercalates and exfoliated intercalates with polar solvents in modifying rheology, e.g., of cosmetics, oil-well drilling fluids, paints, lubricants, especially food grade lubricants in the manufacture of oil and grease, and the like.

Once exfoliated, the platelets of the intercalate are predominantly completely separated into individual platelets having intercalant molecules complexed with the platelet surfaces, and the originally adjacent platelets no longer are retained in a parallel, spaced disposition, but are free to move as predominantly individual, intercalant-coated (continuously or discontinuously) platelets throughout an EVOH carrier or throughout an EVOH matrix polymer melt to act similar to a nanoscale filler material for the matrix polymer. The predominantly individual phyllosilicate platelets, having their platelet surfaces complexed with intercalant molecules, are randomly, homogeneously and uniformly dispersed throughout a carrier, such as water or an organic liquid, or throughout an EVOH copolymer melt. Once an EVOH matrix polymer/platelet composite material is set and hardened into a desired shape, the predominantly individual phyllosilicate platelets are permanently fixed in position and are randomly, homogeneously and uniformly dispersed, predominantly as individual platelets, throughout the matrix polymer/platelet composite material.

In accordance with a preferred embodiment of the present invention, the phyllosilicate should include at least 4% by weight water, up to about 5000% water, based on the dry weight of the phyllosilicate, preferably about 7% to about 100% water, more preferably about 25% to about 50% by weight water, prior to or during contact with the intercalant to achieve sufficient intercalation for exfoliation. Preferably, the phyllosilicate should include at least about 4% by weight water before contact with the intercalating carrier for efficient intercalation. The amount of intercalant in contact with the phyllosilicate from the intercalating composition, for efficient exfoliation, should provide an intercalant/phyllosilicate weight ratio (based on the dry weight of the phyllosilicate) of at least about 1:20, preferably at least about 3.2:20, and more preferably about 4–14:20, to provide efficient sorption and complexing (intercalation) of the intercalant between the platelets of the layered material, e.g., phyllosilicate, (preferably about 16% to about 70% by weight intercalant, based on the dry weight of the layered silicate material).

The intercalants are introduced in the form of a solid or liquid composition (neat or aqueous solution or dispersion, and/or with an organic solvent, e.g., hydroalcoholic) having an intercalant concentration of at least about 2%, preferably at least about 5% by weight intercalant, more preferably at least about 50% to about 100% by weight intercalant in the intercalant/carrier composition contacting the layered material (intercalating composition) for intercalant sorption and complexing. The intercalant can be water-soluble, water-insoluble or partially water-soluble and can be added as a liquid or solid with the addition to the layered material blend of at least about 20% water, e.g., about 20% to about 80% water, preferably at least about 30% water to about 5000% water and/or other solvent for the intercalant, based on the dry weight of layered material plus intercalant. Preferably about 30% to about 50% water or other solvent should be included in the intercalating composition, so that less water or solvent is sorbed by the intercalate, thereby necessitating less drying energy after intercalation. The intercalant may be introduced into the spaces between every layer, nearly every layer, or at least a predominance of the layers of the layered material such that the subsequently exfoliated platelet particles are preferably, predominantly less than about 5 layers in thickness; more preferably, predominantly about 1 or 2 layers in thickness; and most preferably, predominantly single platelets.

Any swellable layered material that sufficiently sorbs the intercalant to increase the interlayer spacing between adjacent phyllosilicate platelets to at least about 5 Å, preferably at least about 10 Å (when the phyllosilicate is measured dry—having a maximum of about 5% by weight water) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as ledikite and admixtures of illites with the clay minerals named above.

Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent dry layers as they are assembled in the layered material before any delamination (exfoliation) takes place. The interlayer spacing is measured when the layered material is "air dry", e.g., contains about 3–10% by weight water, preferably about 3–6% by weight water, based on the dry weight of the layered material. The preferred clay materials generally include interlayer cations such as $Na^+$, $Ca^{+2}$, $K^+$, $Mg^{+2}$, $NH_4^+$ and the like, including mixtures thereof.

The amount of intercalant intercalated into the swellable layered materials useful in this invention, in order that the intercalated layered material may be exfoliated or delaminated into individual platelets, may vary substantially between about 10% and about 80%, based on the dry weight of the layered silicate material. In the preferred embodiments of the invention, amounts of intercalants employed, with respect to the dry weight of layered material being intercalated, will preferably range from about 8 grams of intercalant/100 grams of layered material (dry basis), more preferably at least about 10 grams of intercalant/100 grams of layered material, to about 80–90 grams intercalant/100 grams of layered material (dry basis). More preferred amounts are from about 20 grams intercalant/100 grams of layered material to about 60 grams intercalant/100 grams of layered material (dry basis).

The intercalants are introduced into (sorbed within) the interlayer spaces of the layered material in one of two ways. In a preferred method of intercalating, the layered material is intimately mixed, e.g., by extrusion, with a concentrated intercalant or intercalant/water solution, or intercalant/organic solvent, e.g., ethanol solution. To achieve the best intercalation for exfoliation, the layered material/intercalant blend contains at least about 8% by weight intercalant, preferably at least about 10% by weight intercalant, based on the dry weight of the layered material. The intercalating carrier (preferably water, with or without an organic solvent, e.g., ethanol) can be added by first solubilizing or dispersing the intercalant in the carrier; or the dry intercalant and relatively dry phyllosilicate (preferably containing at least about 4% by weight water) can be blended and the intercalating carrier added to the blend, or to the phyllosilicate prior to adding the dry intercalant. In every case, it has been found that surprising sorption and complexing of intercalant between platelets is achieved at relatively low loadings of intercalating carrier, especially $H_2O$, e.g., about 4% by weight water, based on the dry weight of the phyllosilicate.

When intercalating the phyllosilicate in slurry form (e.g., 900 pounds water, 100 pounds phyllosilicate, 25 pounds polymer) the amount of water can vary from a preferred minimum of at least about 30% by weight water, with no upper limit to the amount of water in the intercalating composition (the phyllosilicate intercalate is easily separated from the intercalating composition).

Alternatively, the intercalating carrier, e.g., water, with or without an organic solvent, can be added directly to the phyllosilicate prior to adding the intercalant, either dry or in solution. Sorption of the intercalant molecules may be performed by exposing the layered material to dry or liquid intercalant compositions containing at least about 2% by weight, preferably at least about 5% by weight intercalant, more preferably at least about 50% intercalant, based on the dry weight of the layered material. Sorption may be aided by exposure of the intercalating composition to heat, pressure, ultrasonic cavitation, or microwaves.

In accordance with another method of intercalating the intercalant between the platelets of the layered material and exfoliating the intercalate, the layered material, containing at least about 4% by weight water, preferably about 10% to about 15% by weight water, is blended with a solubilized intercalant (in a water or organic solvent carrier) in a ratio sufficient to provide at least about 8% by weight, preferably at least about 10% by weight intercalant, based on the dry weight of the layered material. The blend then preferably is extruded for faster intercalation. Further, the blend can be heated to at least the melt temperature of the intercalant, and preferably at least about 40°–50° C. above the intercalant melt temperature for faster intercalation.

In accordance with one important embodiment of the present invention, one or more polymerizable monomers can be intercalated between the platelets of the layered material, or simply admixed with the exfoliated layered material, and the polymerizable monomer(s) are polymerized while intercalated between platelets, or while in contact with the intercalate or exfoliated intercalate. The polymerizable monomer(s) can be, for example, a mixture of an acrylic acid and a polymerization initiator for the acrylic acid to produce water-soluble polyacrylic acid or polyacrylate; or a cross-linking agent can be added to produce a water-insoluble polymer; or the monomer(s) can be any of the polymerizable organic liquids, that polymerize to form a polymer, such as the water-soluble polymers disclosed in U.S. Pat. No. 4,251, 576, hereby incorporated by reference.

Suitable water-insoluble polymerizable monomer(s) can be, for example, a mixture of a diamine and a dicarboxylic acid suitable for reaction to produce a polyamide, e.g., nylon; or the monomer(s) can be any of the polymerizable organic liquids, that polymerize to form a water-insoluble polymer, disclosed in U.S. Pat. No. 4,251,576, hereby incorporated by reference.

The preferred polymer intercalants are water-soluble, such as polyvinylpyrrolidone (PVP) having a monomeric structure (I) as follows:

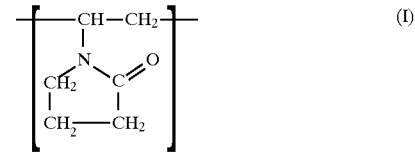
(I)

The water-solubility of PVP can be adjusted according to (1) the degree of hydrolysis of the polyvinyl-pyrrolidone, and (2) by forming a metal salt of PVP, such as sodium or potassium. PVP can be hydrolyzed to the structure (II):

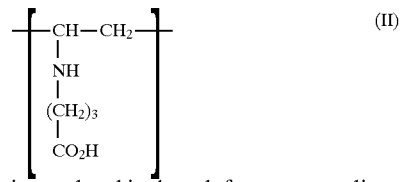
(II)

and the PVP can be intercalated in the salt form, e.g., sodium or potassium polyvinylpyrrolidone. Preferred PVP intercalants, and the following PVP derivatives, should have a weight average molecular weight in the range of about 100 to about 100,000 or more, more preferably about 1,000 to about 40,000.

Other suitable water-soluble vinyl polymers include poly (vinyl alcohol)

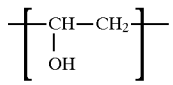

The polyvinyl alcohols function best when they are essentially fully hydrolyzed, e.g., 5% or less acetyl groups, preferably 1% or less residual acetyl groups. The lower molecular weight PVOH's function best, e.g., a weight average molecular weight of about 2,000 to about 10,000, but higher molecular weights also function, e.g., up to about 100,000.

The polyacrylic acid polymers and copolymers and partially or fully neutralized salts, e.g., metal salts, are also suitable, having monomer units:

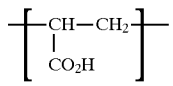

and are commercially available as CARBOPOL resins from B. F. Goodrich and PRIMAL resins from Rohm & Haas. Light cross-linking is acceptable, so long as water-solubility is retained. Weight average molecular weights, for the polyacrylic polymers and copolymers described above and below, of about 10,000 or less, e.g., 200–10,000, intercalate more easily, but higher molecular weights up to about 100,000 or more also function.

Other suitable intercalant polymers are disclosed in this assignee's U.S. Pat. No. 5,552,469, incorporated by reference.

Suitable water-insoluble intercalant polymers include polyamides; polyesters; polycarbonates; polyurethanes; polyepoxides; polyolefins; polyalkylamides; and mixtures thereof. Suitable water-insoluble polymers include:

polyethers (polymers and copolymers) based on ethylene oxide, butylene oxide, propylene oxide, phenols and bisphenols;
 polyesters (polymers and copolymers) based on aliphatic and aromatic diols, and aliphatic and aromatic dibasic acids;
 polyurethanes based on aliphatic and aromatic diisocyanates, and aliphatic and aromatic diols;
 polyamides (polymers and copolymers) based on (a) aliphatic and aromatic diamines, and aliphatic and aromatic dibasic acids; (b) aliphatic and aromatic amino acids;
 polycarbonates (polymers and copolymers) based on carbonic acid and aromatic diols);
 polycarbonimides (polymers and copolymers) based on dianhydride of tetrabasic acids and diamines and other heterochain polymers;
 vinyl polymers and copolymers based on vinyl monomers, styrene and derivatives of styrene;
 acryl polymers and copolymers based on acryl monomers;
 copolymers based on styrene, vinyl and acryl monomers;
 polyolefins polymers and copolymers based on ethylene, propylene and other alphaolefin monomers;
 polymers and copolymers based on dienes, isobutylenes and the like; and
 copolymers based on dienes, styrene, acryl and vinyl monomers.

Thermoset resins based on water-soluble prepolymers, include prepolymers based on formaldehyde: phenols (phenol, cresol and the like); urea; melamine; melamine and phenol; urea and phenol. Polyurethanes based on: toluene diisocyanate (TDI) and monomeric and polymeric diphenyl methanediisocyanates (MDI); hydroxy terminated polyethers (polyethylene glycol, polypropylene glycol, copolymers of ethylene oxide and propylene oxide and the like); amino terminated polyethers, polyamines (tetramethylene diamine, ethylenediamine, hexamethylenediamine, 2,2-dimethyl 1,3-propanediamine; melamine, diaminobenzene, triaminobenzene and the like); polyamidoamines (for instance, hydroxy terminated polyesters); unsaturated polyesters based on maleic and fumaric anhydrides and acids; glycols (ethylene, propylene), polyethylene glycols, polypropylene glycols, aromatic glycols and polyglycols; unsaturated polyesters based on vinyl, allyl and acryl monomers; epoxides, based on biphenol A (2,2'-bis(4-hydroxyphenyl)propane) and epichlorohydrin; epoxy prepolymers based on monoepoxy and polyepoxy compounds and α,β unsaturated compounds (styrene, vinyl, allyl, acrylic monomers); polyamides 4-tetramethylene diamine, hexamethylene diamine, melamine, 1,3-propanediamine, diaminobenzene, triaminobenzene, 3,3',4,4'-bitriaminobenzene; 3,3',4,4'-biphenyltetramine and the like). Polyethyleneimines; amides and polyamides (amides of di-, tri-, and tetra acids); hydroxyphenols (pyrogallol, gallic acid, tetrahydroxybenzophenone, tetrahydroquinone, catechol, phenol and the like); anhydrides and polyanhydrides of di-, tri-, and tetr acids; polyisocyanurates based on TDI and MDI; polyimides based on pyromellitic dianhydride and 1,4-phenyldiamine; polybenzimidozoles based on 3,3',4,4'-biphenyltetramine and isophthalic acid; polyamide based on unsaturated dibasic acids and anhydrides (maleic, fumaric) and aromatic polyamides; alkyd resins based on dibasic aromatic acids or anhydrides, glycerol, trimethylolpropane, pentaerythritol, sorbitol and unsaturated fatty long chain carboxylic acids (the latter derived from vegetable oils); and prepolymers based on acrylic monomers (hydroxy or carboxy functional).

The amount of intercalated and/or exfoliated layered material included in an EVOH matrix polymer to form EVOH polymer-based composite materials may vary widely depending on the intended use of the material.

Substantially enhanced barrier properties and heat resistance (deflection temperature under load, DTUL) are imparted by platelet particle concentrations of about 1% to about 5% by weight, particularly 2.5–5% in an EVOH matrix polymer. Similarly, substantially enhanced strength is imparted by platelet particle concentrations greater than about 1.5%, including the nano-scale layered materials of this invention. It is preferred that the platelet loading be less than about 10%. Platelet particle loadings within the range of about 0.05% to about 40% by weight, preferably about 0.5% to about 20%, more preferably about 1% to about 10% of the composite material significantly enhances modulus, dimensional stability, and strength. In general, the amount of platelet particles incorporated into an EVOH matrix polymer is less than about 90% by weight of the mixture, and preferably from about 0.01% to about 80% by weight of the composite material mixture, more preferably from about 0.05% to about 40% by weight of the polymer/particle mixture, and most preferably from about 0.05% to about 20% or 0.05% to about 10% by weight.

In accordance with an important feature of the present invention, the intercalated phyllosilicate can be manufactured in a concentrated form, e.g., 10–90%, preferably 20–80% intercalant and 10–90%, preferably 20–80% intercalated phyllosilicate that can be dispersed in an EVOH matrix polymer and exfoliated before or after addition to the EVOH polymer melt to a desired platelet loading.

Exfoliation of the intercalated layered material should provide delamination of at least about 90% by weight of the intercalated material to provide a composition comprising a polymeric matrix having platelet particles substantially homogeneously dispersed therein. Some intercalates require a shear rate that is greater than about 10 sec$^{-1}$ for such relatively thorough exfoliation. Other intercalates exfoliate naturally or by heating to the melt temperature of the intercalant polymer, or by applying pressure, e.g., 0.5 to 60 atmospheres above ambient, with or without heating. The upper limit for the shear rate is not critical provided that the shear rate is not so high as to physically degrade the polymer. In the particularly preferred embodiments of the invention, when shear is employed for exfoliation, the shear rate is from greater than about 10 sec$^{-1}$ to about 20,000 sec$^{-1}$, and in the more preferred embodiments of the invention the shear rate is from about 100 sec$^{-1}$ to about 10,000 sec$^{-1}$.

When shear is employed for exfoliation, any method which can be used to apply a shear to a flowable mixture or any polymer melt can be used. The shearing action can be provided by any appropriate method, as for example by mechanical means, by thermal shock, by pressure alteration, or by ultrasonics, all known in the art. In particularly useful procedures, the flowable polymer mixture is sheared by mechanical methods in which portions of the melt are caused to flow past other portions of the mixture by use of mechanical means, such as stirrers, Banbury® type mixers, Brabender® type mixers, long continuous mixers, and extruders. Another procedure employs thermal shock in which shearing is achieved by alternatively raising or lowering the temperature of the mixture causing thermal expansions and resulting in internal stresses which cause the shear. In still other procedures, shear is achieved by sudden pressure changes in pressure alteration methods; by ultrasonic techniques in which cavitation or resonant vibrations which cause portions of the mixture to vibrate or to be excited at different phases and thus subjected to shear. These methods of shearing flowable polymer mixtures and polymer melts are merely representative of useful methods, and any method known in the art for shearing flowable polymer mixtures and polymer melts may be used.

Mechanical shearing methods may be employed such as by extrusion, injection molding machines, Banbury® type mixers, Brabender® type mixers and the like. Shearing also can be achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone, etc.) are several variables which control the amount of shear to be applied.

Exfoliation should be sufficiently thorough to provide at least about 80% by weight, preferably at least about 85% by weight, more preferably at least about 90% by weight, and most preferably at least about 95% by weight delamination of the layers to form platelet particles substantially homogeneously dispersed in the polymer matrix. As formed by this process, the platelet particles dispersed in EVOH matrix polymers have the thickness of the individual layers, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all individual layers delaminate one from the other to form separate platelet particles. In cases where intercalation is incomplete between some layers, those layers will not delaminate in a polymer melt, and will form platelet particles comprising those layers in a coplanar aggregate.

The effect of adding into an EVOH matrix polymer the nanoscale particulate dispersed platelet particles, derived from the intercalates formed in accordance with the present invention, typically is an increase in gas impermeability, tensile modulus and/or ultimate tensile strength or an increase in ultimate impact resistance or glass transition temperature (Tg).

Molding compositions comprising the EVOH matrix polymer containing a desired loading of platelets obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials such as wood, glass, ceramic, metal, and other plastics. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

The polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles and matrix polymer that form the nanocomposites are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The following specific examples are presented to more particularly illustrate the invention and are not to be construed as limitations thereon.

EXAMPLE 1

Preparation of Clay—PVP Complexes (Intercalates)
Materials
    Clay—sodium montmorillonite;

PVP—molecular weights of 10,000 and 40,000.

To prepare Clay (sodium montmorillonite)—PVP complexes (intercalates) we used three different processes for polymer intercalation:

1. Mixture of the 2% PVP/water solution with the 2% clay/water suspension in a ratio sufficient to provide a polymer concentration of at least about 16% based on the dry wight of the clay.
2. Dry clay powder (about 8% by weight moisture) was gradually added to the 2% PVP/water solution in a ratio sufficient to provide a polymer concentration of at least about 16% based on the weight of the clay.
3. Dry PVP was mixed with dry clay, the mixture was hydrated with 35–38% of water, based on the dry weight of the clay, and then extruded.

Mixtures 1 and 2 were agitated at room temperature during 4 hours.

The weight ratio Clay:PVP was changed from 80:20 to 20:80.

These experiments show that all methods of preparation yielded the Clay—PVP complexes (intercalates), and the results of the intercalation do not depend on the method of preparation (1, 2, or 3) or molecular weight of the intercalant polymer (PVP), but do depend on the quantity of PVP sorbed between clay platelets. In Table 1 the results of the X-ray diffraction for Clay—PVP complexes with different ratios of components are demonstrated. The plot of these data is shown in FIG. 1. From these data (Table 1, FIG. 1) one can see the step character of intercalation while the polymer is being sorbed in the interlayer space between adjacent platelets of the montmorillonite clay. There are increasing d(001) values from 12 Å for clay with no PVP sorbed to 24–25 Å spacing between adjacent platelets with sorption of 20–30% PVP. The next step to 30–32 Å spacing occurs when the sorbed PVP content is increased to 40–60%. Further increasing the sorbed PVP content to 70–80% increases the d(001) values to 40–42 Å. There are d(002) reflexes together with d(001) reflexes in x-ray patterns of all complexes obtained (Table 1, FIG. 1). This indicates the regularity of Clay—PVP complex structures.

TABLE 1

|   | PVP, %* | d(001), Å | d(002), Å |
|---|---|---|---|
| 1 | 0.0 | 12.4 | 6.2 |
| 2 | 20.0 | 24.0 | 11.4 |
| 3 | 30.0 | 25.0 | 12.0 |
| 4 | 40.0 | 30.0 | 15.2 |
| 5 | 45.0 | 31.0 | 15.2 |
| 6 | 50.0 | 30.0 | 15.5 |
| 7 | 55.0 | 32.0 | 16.5 |
| 8 | 60.0 | 34.0 | 17.0 |
| 9 | 70.0 | 40.0 | 21.0 |
| 10 | 80.0 | 42.0 | 21.0 |

*Percent by weight, based on the dry weight of the clay.

EXAMPLE 2

Preparation of Clay—PVOH Complexes (Intercalates)

Materials

Clay—sodium montmorillonite;

PVOH—degree of hydrolysis 75–99%, —molecular weights of 5,000 and 8,000.

To prepare Clay (sodium montmorillonite)—PVOH complexes (intercalates) we provided three different processes for polymer intercalation:

1. Mixture of the 2% PVOH/water solution with the 2% clay/water suspension in a ratio sufficient to provide a polymer concentration of at least about 16% based on the dry wight of the clay.
2. Dry clay powder was gradually added to the 2% PVOH/water solution in a ratio sufficient to provide a polymer concentration of at least about 16% based on the weight of the clay.
3. Dry clay was moisturized with PVOH/water solution to a moisture content of 20–80% water, and then extruded.

The mixtures 1 and 2 were agitated at room temperature during 4 hours.

The weight ratio Clay:PVOH was changed from 80:20 to 20:80.

Some of the exfoliates were studied by x-ray diffraction. These experiments show that all methods of preparation yielded the composite Clay—PVOH complexes (intercalates), and the results of the intercalation do not depend on the method of preparation (1, 2, or 3), or molecular weight of the intercalant polymer (PVOH), or degree of hydrolysis, but do depend on the concentration of PVOH sorbed between clay platelets. In Table 2 the results of the X-ray diffraction for Clay—PVOH complexes with different ratios of components are demonstrated. The plot of these data is shown in FIG. 2. From these data (Table 2, FIG. 2) one can see the step character of increasing d(001) values from 12 Å for clay with no sorbed PVOH to 22–25 Å spacing between adjacent platelets with sorption of 20–30% PVOH. The next step to 30–33 Å occurs when the sorbed PVOH content increases to 35–50%. A further increase of the sorbed PVOH content to 60–80% increases the d(001) values to 40–45 Å.

Heating of samples at 120° C. during 4 hours insignificantly changed the d(001) values (Table 2, FIG. 2).

TABLE 2

|   | PVOH %* | d(001), Å | d(001), Å 120° C. |
|---|---|---|---|
| 1 | 0.0 | 12.4 | |
| 2 | 20.0 | 23.0 | 22.0 |
| 3 | 30.0 | 25.0 | 24.0 |
| 4 | 35.0 | 32.0 | 32.0 |
| 5 | 40.0 | 31.0 | 30.0 |
| 6 | 45.0 | 33.0 | 32.0 |
| 7 | 50.0 | 32.0 | 32.0 |
| 8 | 60.0 | 42.0 | 42.0 |
| 9 | 70.0 | 44.0 | 42.0 |
| 10 | 80.0 | 45.0 | 44.0 |

*Percent by weight, based on the dry weight of the clay.

Figure 3:
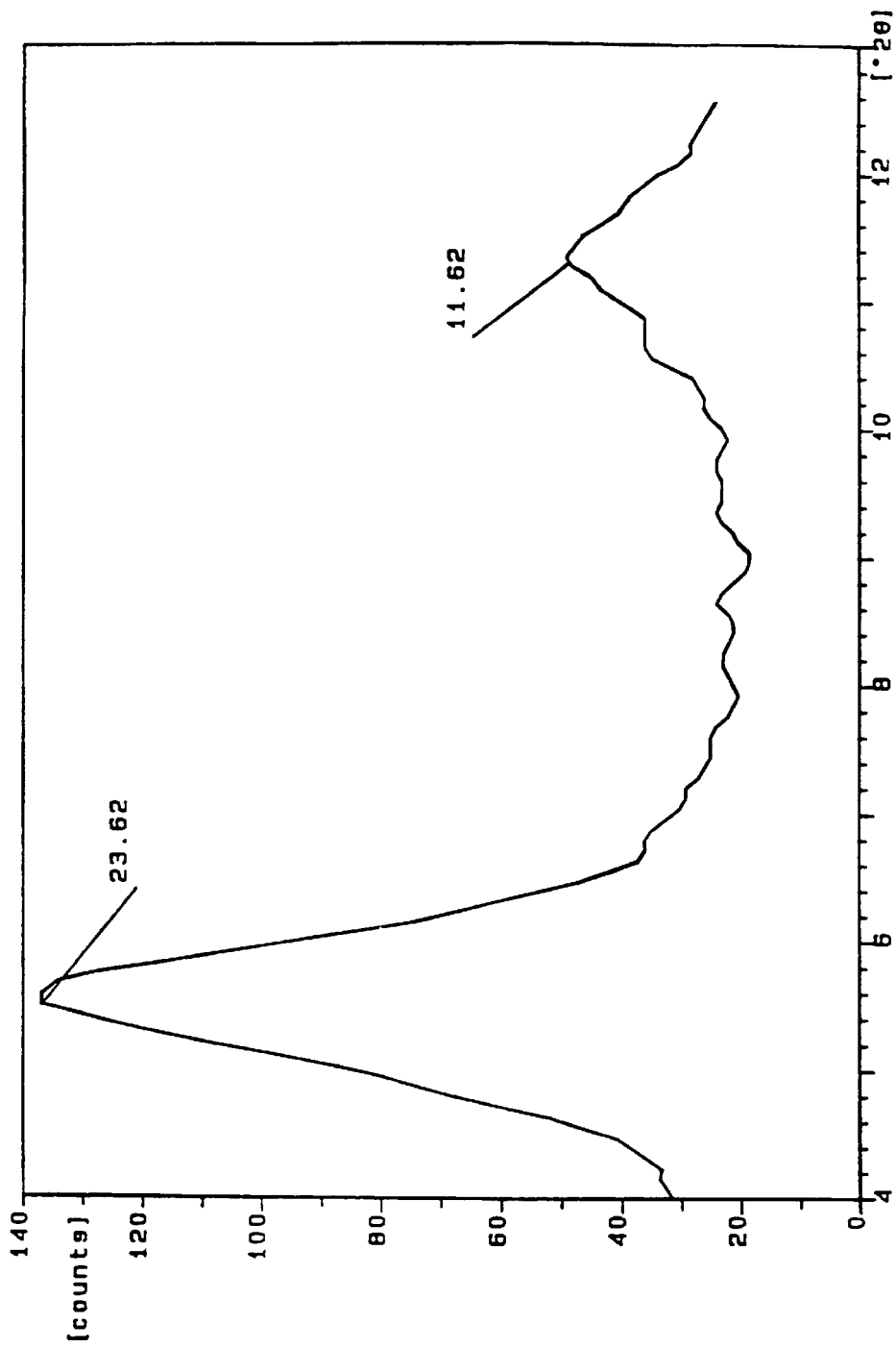
FIG. 3 is an x-ray diffraction pattern for a complex of PVP (weight average molecular weight of 10,000):sodium montmorillonite clay, in Angstroms, at a weight ratio of PVP:clay of 20:80.
Figure 4:
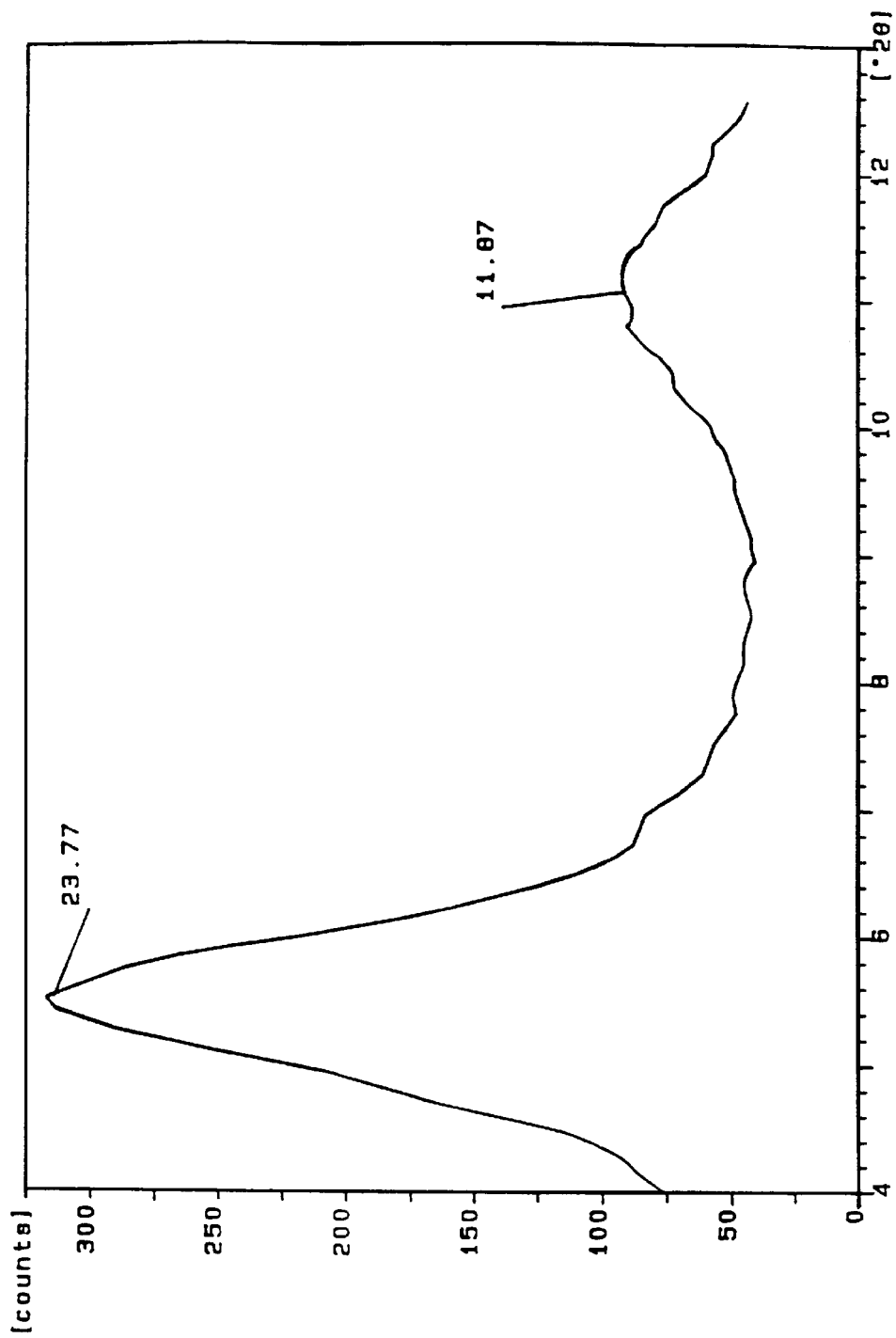
FIG. 4 is an x-ray diffraction pattern for a complex of PVP (weight average molecular weight of 40,000):sodium montmorillonite clay, in Angstroms, at a weight ratio of PVP:clay of 20:80.
Figure 5:
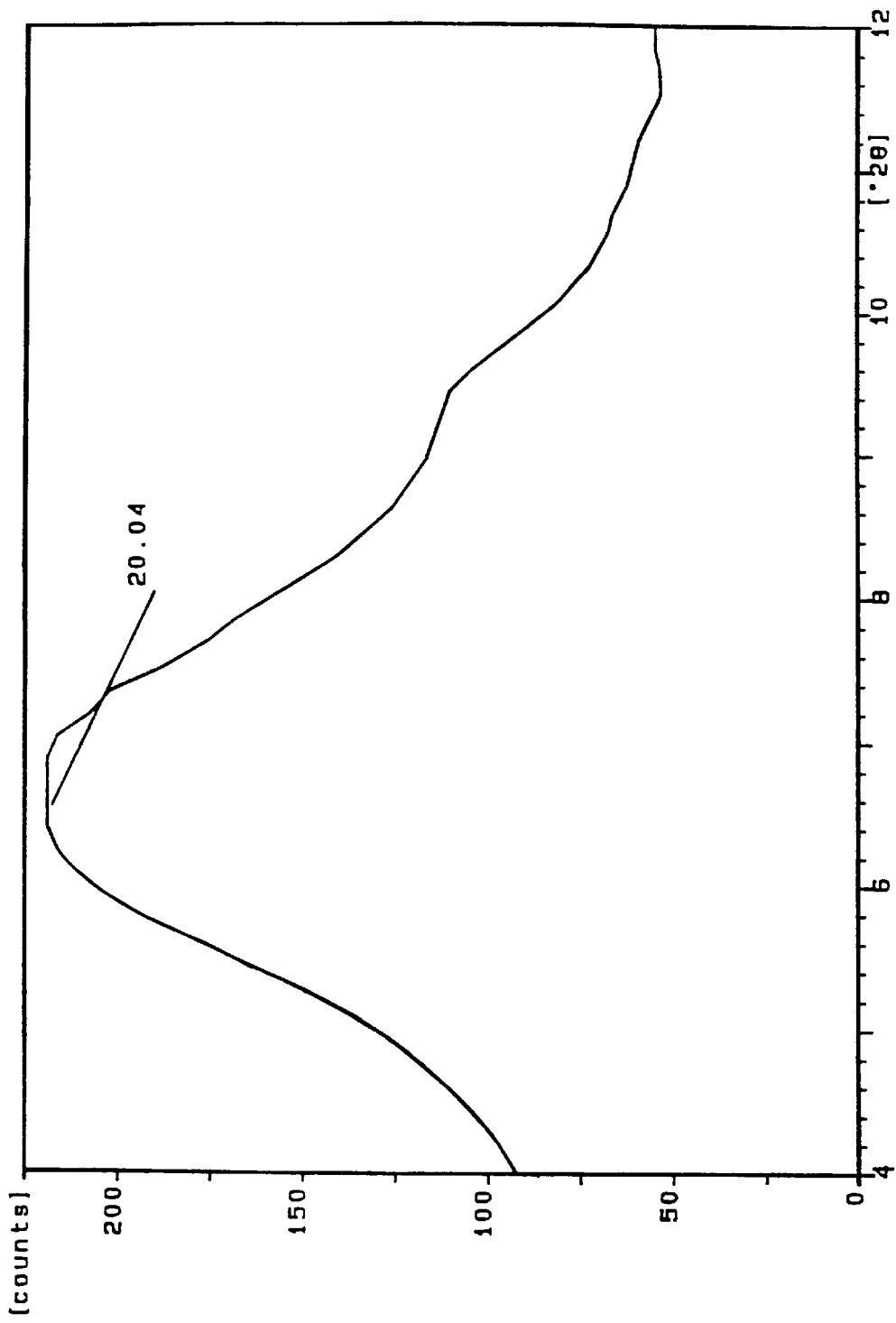
FIG. 5 is an x-ray diffraction pattern for a complex of PVOH (weight average molecular weight of 15,000):sodium montmorillonite clay, in Angstroms, at a weight ratio of PVOH:clay of 20:80.
Figure 6:
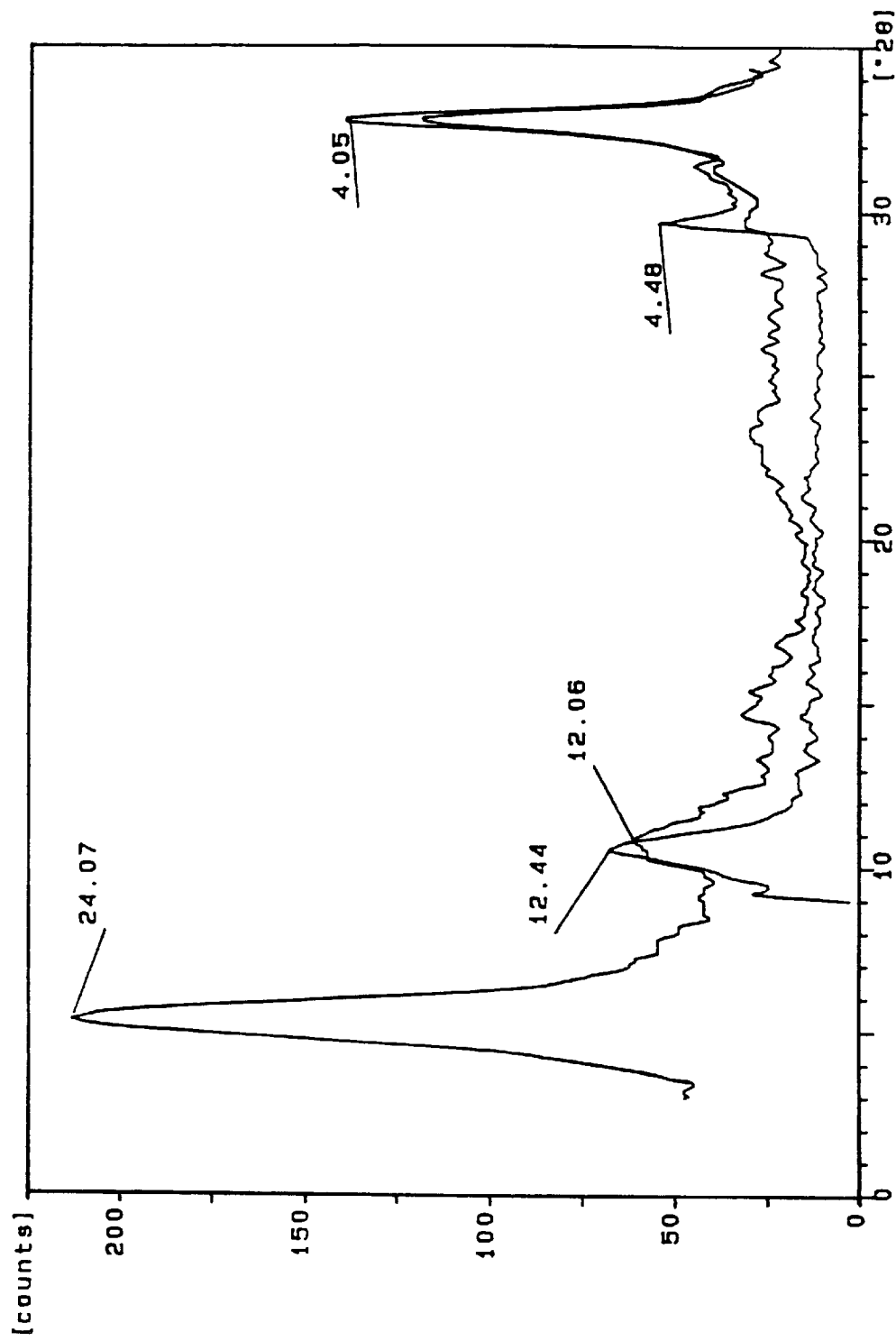
FIG. 6 is an x-ray diffraction pattern for a complex of PVP:sodium montmorillonite clay, in Angstroms, at a weight ratio of PVP:clay of 20:80 (upper pattern); and an x-ray diffraction pattern for ≈100% sodium montmorillonite clay having a crystobalite impurity (lower pattern)
Figure 7:
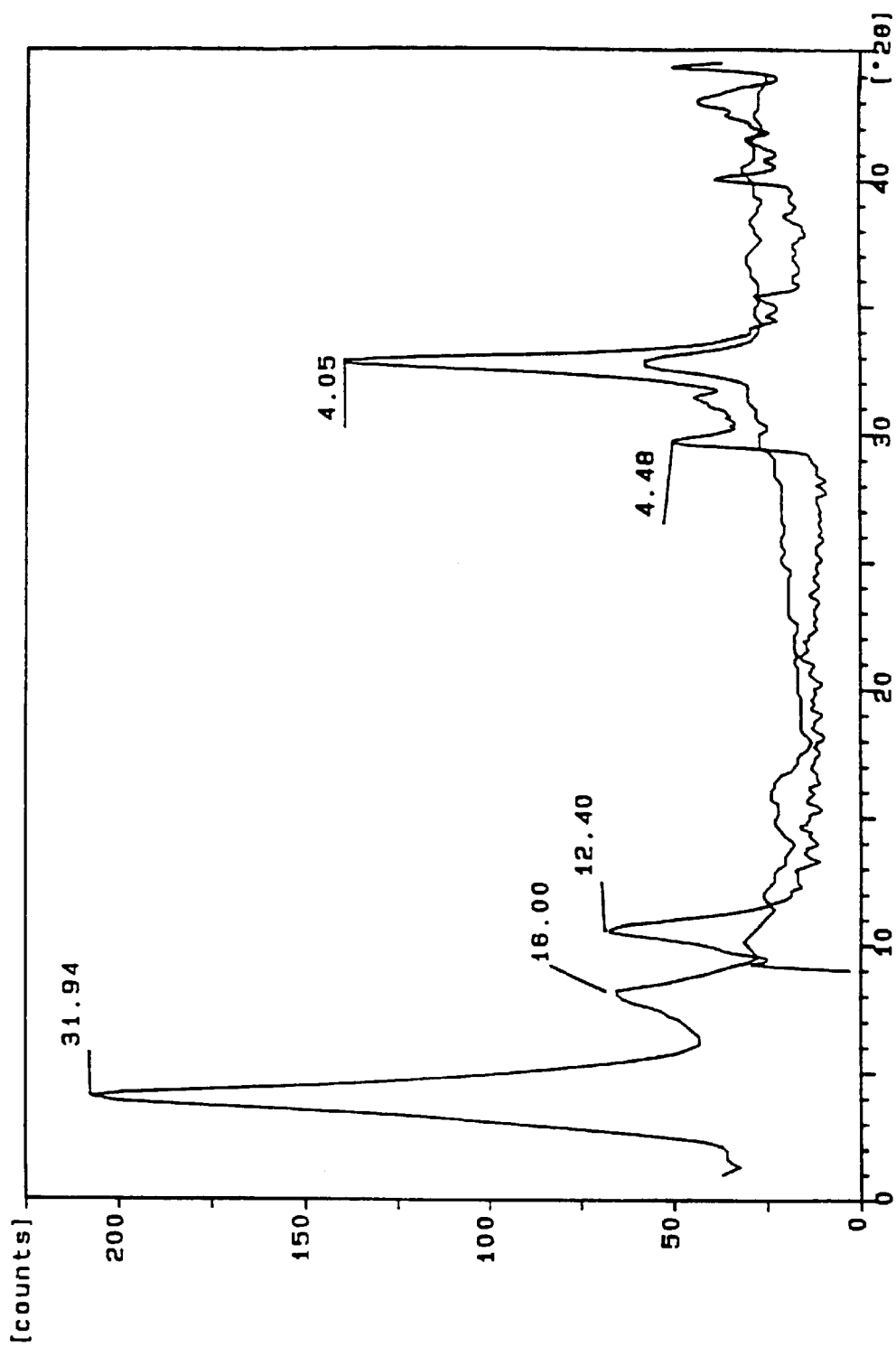
FIG. 7 is an x-ray diffraction pattern for a complex of PVP:sodium montmorillonite clay, in Angstroms, at a weight ratio of PVP:clay of 50:50 (upper pattern); and an x-ray diffraction pattern for ≈100% sodium montmorillonite clay having a crystobalite impurity (lower pattern)

The graphs of FIGS. 3 to 5 are x-ray diffraction patterns of blends of different water-soluble polymer intercalants with sodium bentonite clay. The pattern of FIGS. 3 and 4 are taken from intercalated clay 20% by weight polyvinylpyrrolidone (weight average molecular weight=10,000 for FIG. 3; 40,000 for FIG. 4) and 80% by weight sodium bentonite clay. The blends were formed by mixing the PVP and clay from a 2% solution of PVP and a 2% dispersion of sodium bentonite in a 1:4 ratio, respectively. As shown, the PVP-:clay complexed since no d(001) smectite peak appears at about 12.4 Å. Similar results are shown for 20% polyvinyl alcohol, 80% sodium bentonite, as shown in FIG. 5, blended in the same way and in the same ratio. The d(001) peak of non-exfoliated (layered) sodium bentonite clay appears at about 12.4 Å, as shown in the x-ray diffraction pattern for sodium bentonite clay (containing about 10% by weight water) in the lower x-ray diffraction patterns of FIGS. 6 and 7. The graphs of FIG. 6 are x-ray diffraction patterns of sodium bentonite clay (montmorillonite) and a PVP:clay complex that was obtained by extrusion of a blend of 20% by weight polyvinylpyrrolidone (molecular weight 10,000) and 80% sodium bentonite clay (containing a crystobalite impurity, having a d-spacing of about 4.05 Å) with 35% water by weight of dry clay. As shown in FIG. 6, the PVP clay complexed since no d(001) smectite peak appears at about 12.4 Å. There are basal spacings with a d(001) peak of PVP:clay complex at about 24 Å and d(002) peak of PVP:clay complex at about 12 Å, that shows close to regular structure of this intercalated composite with a PVP:clay ratio equal to 1:4. The graphs of FIG. 7 are x-ray diffraction patterns of sodium bentonite clay (montmorillonite) and PVP:clay complex that was obtained by extrusion of blend of 50% by weight polyvinylpyrrolidone (molecular weight 10,000) and 50% of sodium bentonite clay (containing a crystobalite impurity, having d-spacing of about 4.05 Å) with 35% water by weight of dry clay. As shown in FIG. 7, the PVP:clay complexed since no d(001) smectite peak appears at about 12.4 Å. There are basal spacings with a d(001) peak of the PVP:clay complex at about 32 Å and a d(002) peak of PVP:clay complex at about 16 Å that shows close to regular structure of this intercalated composite with a PVP:clay ratio equal to 1:1. When mechanical blends of powdered sodium bentonite clay (containing about 10% by weight water) and powdered polyvinylpyrrolidone (PVP) polymer were mixed with water (about 75% by weight water), the polymer was intercalated between the bentonite clay platelets, and an exothermic reaction occurred that, it is theorized, resulted from the polymer being bonded to the internal faces of the clay platelets sufficiently for exfoliation of the intercalated clay.

It should be noted, also, that exfoliation did not occur unless the bentonite clay included water in an amount of at least about 4% by weight, based on the dry weight of the clay, preferably about 10% to about 15% water. The water can be included in the clay as received, or can be added to the clay prior to or during polymer contact.

It should also be noted that the exfoliation occurred without shearing—the layered clay exfoliated naturally after sufficient intercalation of polymer between the platelets of the layered bentonite—whether the intercalate was achieved by using sufficient water, e.g., about 20% to about 80% by weight, based on the dry weight of the clay, for sufficient migration of the polymer into the interlayer spaces, and preferably also extruding; or by heating the blends to at least the intercalant polymer melt temperature, while the clay includes at least about 5% by weight water, for polymer intercalation.

Figure 8:
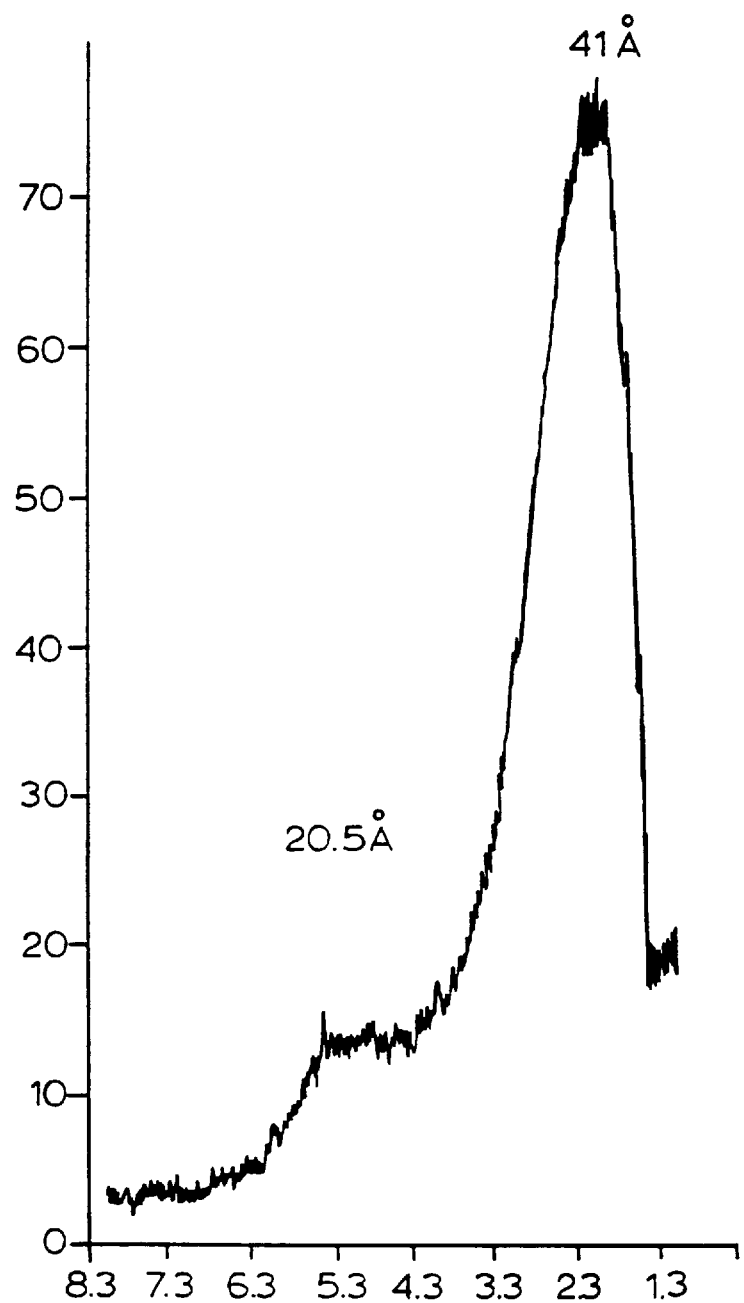
FIG. 8 is a portion of an x-ray diffraction pattern for PVP:sodium montmorillonite clay, in Angstroms, at a PVP:clay ratio of 80:20, showing a PVP:clay complex peak or d(001) spacing of about 41 Å.

The x-ray diffraction pattern of FIG. 8 shows that at a ratio of 80% PVP, 20% clay, the periodicity of the intercalated composite with a PVP:clay ratio equal to 4:1 is increased to about 41 Å.

EXAMPLE 3

Figure 9:
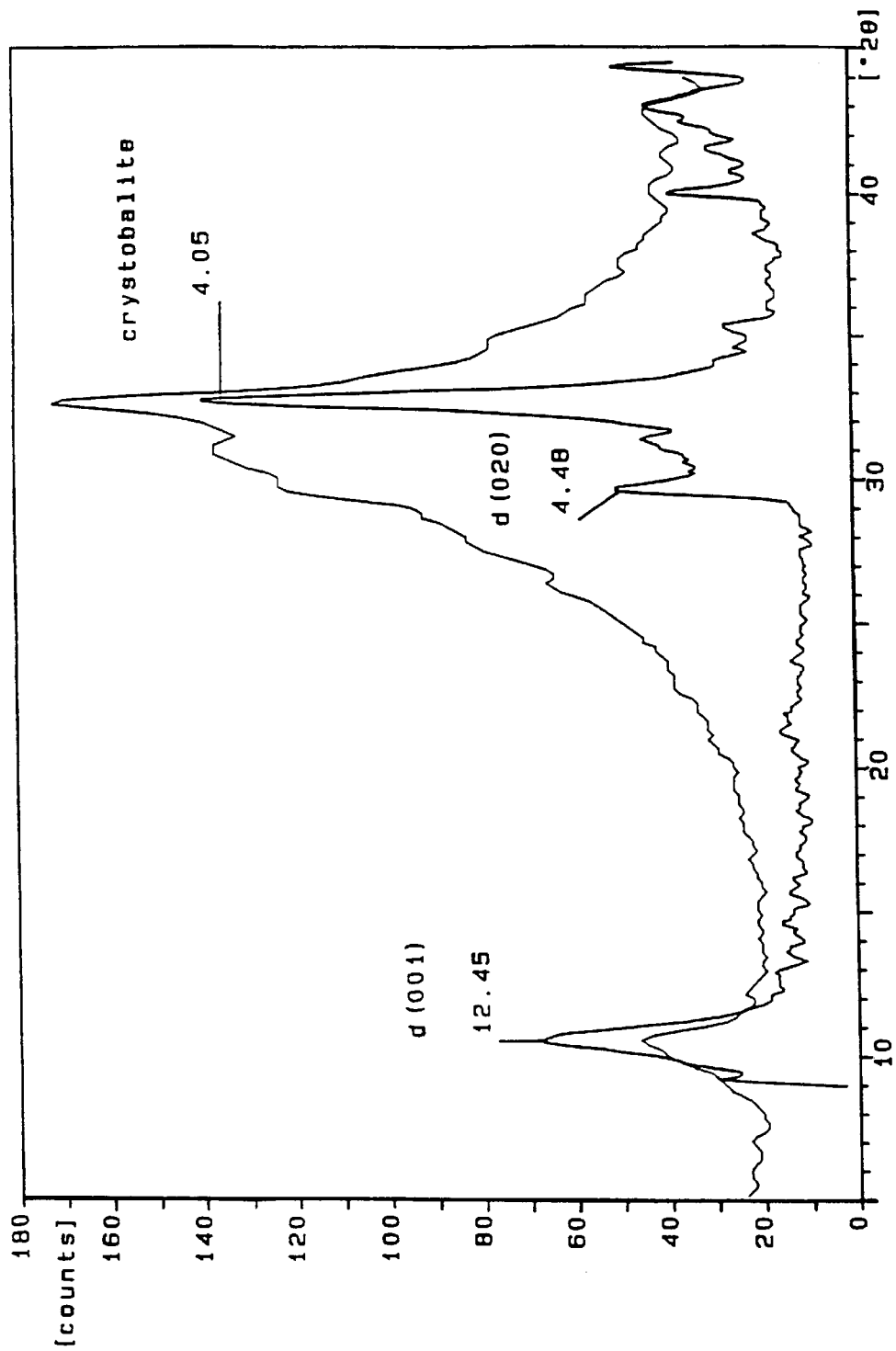
FIG. 9 is an x-ray diffraction pattern for a mechanical blend of a polyamide and a dry (about 8% by weight moisture) sodium montmorillonite clay in a weight ratio of 80 polyamide:20 sodium montmorillonite clay (upper pattern); and ≈100% sodium montmorillonite clay, with a crystobalite impurity, (lower pattern), showing characteristic smectite clay d(001) peaks at about 12.4 Å, d(020) smectite clay peaks at about 4.48 Å; and a crystobalite impurity peak at about 4.05 Å for both upper and lower patterns.

The upper x-ray diffraction pattern shown in FIG. 9 was taken on a mechanical blend of 80% by weight polyamide and 20% by weight sodium bentonite clay. The lower x-ray diffraction pattern was taken on 100% sodium bentonite clay. The polyamide was not intercalated between the clay platelets since the blend was dry (clay contained about 8% by weight water) and the polyamide was not melted. As shown in FIG. 1, both diffraction patterns show the characteristic d(001) 12.45 Å and the d(020) 4.48 Å peaks characteristic of non-exfoliated smectite clays and a 4.05 Å peak characteristic of a crystobalite impurity.

Figure 10:
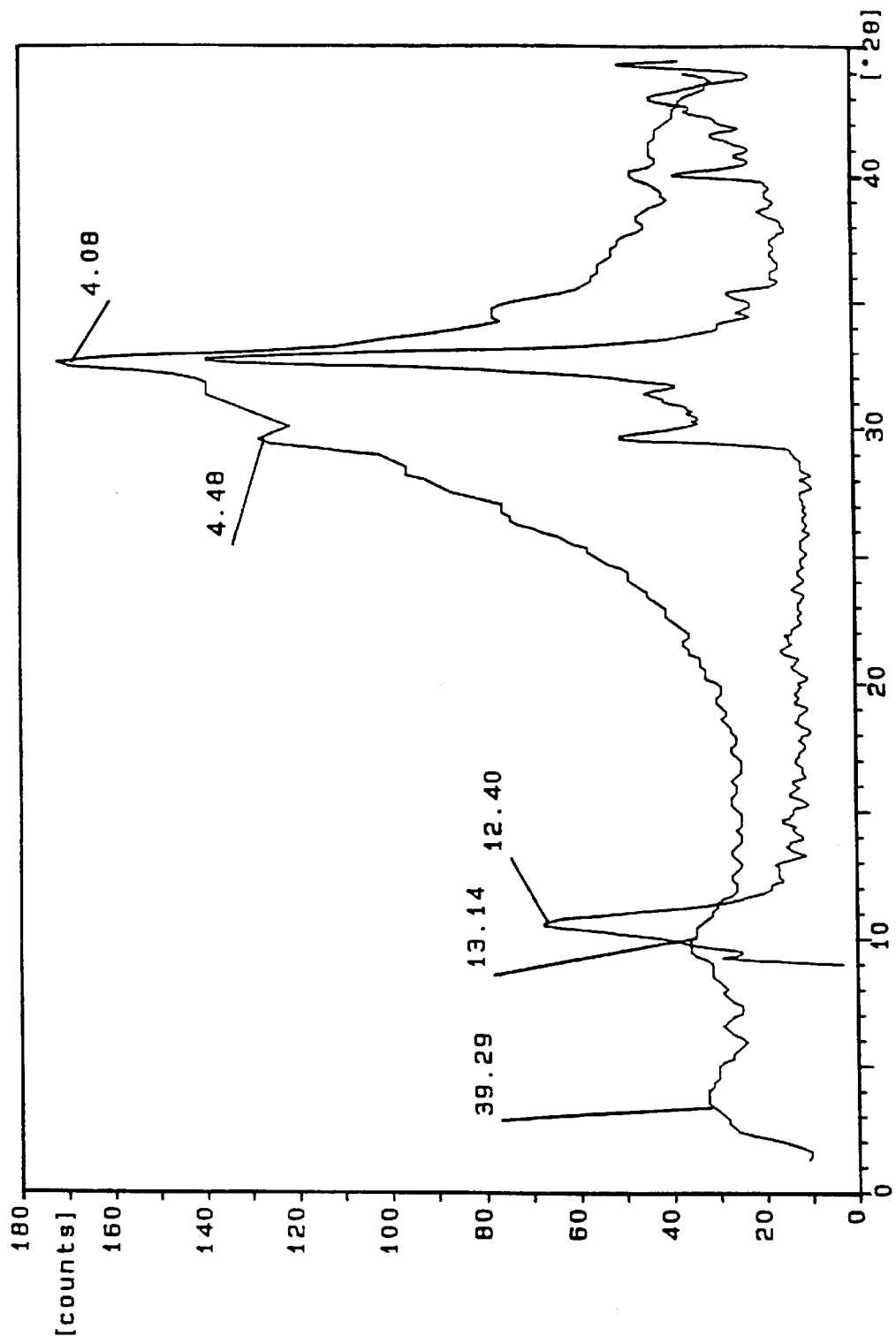
FIG. 10 is an x-ray diffraction pattern for the mechanical blend shown in the upper pattern (80 polyamide:20 sodium montmorillonite clay) of FIG. 9, after heating the mechanical blend to the melt temperature of the polyamide (upper pattern) to achieve intercalation and exfoliation, in comparison to the x-ray diffraction pattern for ≈100% sodium montmorillonite clay, having a crystobalite impurity, (lower pattern), showing the disappearance of the characteristic smectite clay d(001) peak at about 12.4 Å; the d(020) peak at about 4.48 Å, characteristic of single smectite platelets; and a characteristic crystobalite impurity peak at about 4.08 Å (upper pattern)

As shown in FIG. 10, when the 80% polyamide, 20% sodium bentonite mechanical blend was heated to the polyamide melt temperature, and preferably at least about 40°–50° C. above, the polymer melt temperature for faster intercalation, e.g., 230° C., (see the upper x-ray diffraction pattern for the melt) the smectite d(001) peak at 12.45 Å was no longer present, since the polyamide was intercalated between the clay platelets and the platelets were exfoliated, thereby eliminating the d(001) periodicity characteristic of aligned smectite platelets. The mechanical blend was melted by heating the blend to the melt temperature under a $N_2$ head space to avoid oxidation. The lower x-ray diffraction pattern in FIG. 10 again is the 100% sodium bentonite pattern for comparison.

Alternatively, the mechanical blend could be blended with about 10% by weight, preferably about 20% to about 50% by weight water or organic solvent, based on the total weight of the blend, and extruded to achieve intercalation and exfoliation.

EXAMPLE 4

Figure 11:
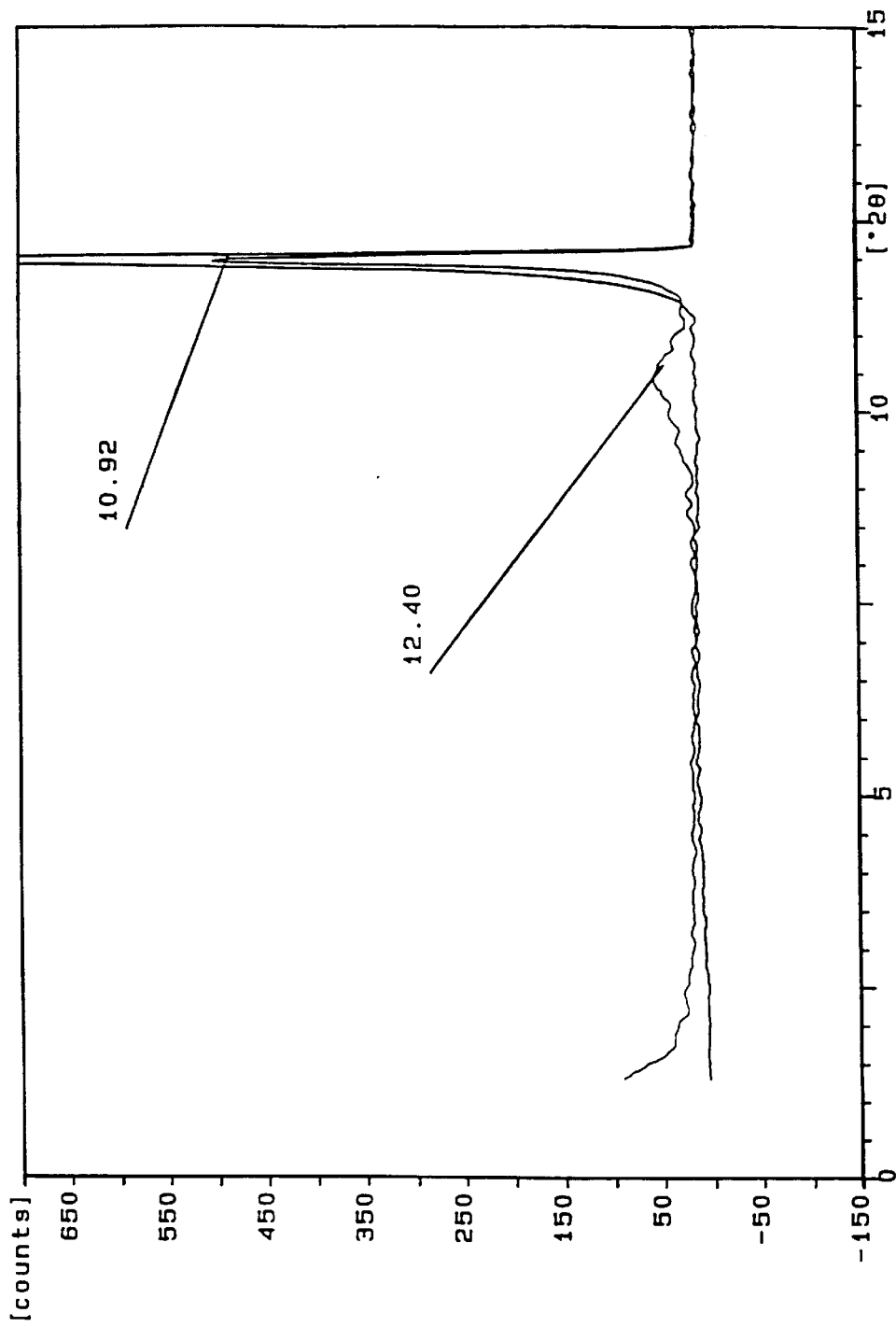
FIG. 11 is an x-ray diffraction pattern similar to FIG. 9, showing a mechanical blend of dimethylterephthalate (DMTPh) (70% by weight) and dry (about 8% moisture) sodium montmorillonite clay (30% by weight), on a smaller scale than FIG. 9, showing a characteristic smectite clay d(001) peak at about 12.4 Å for the mechanical blend; and an x-ray diffraction pattern for 100% DMTPh.
Figure 12:
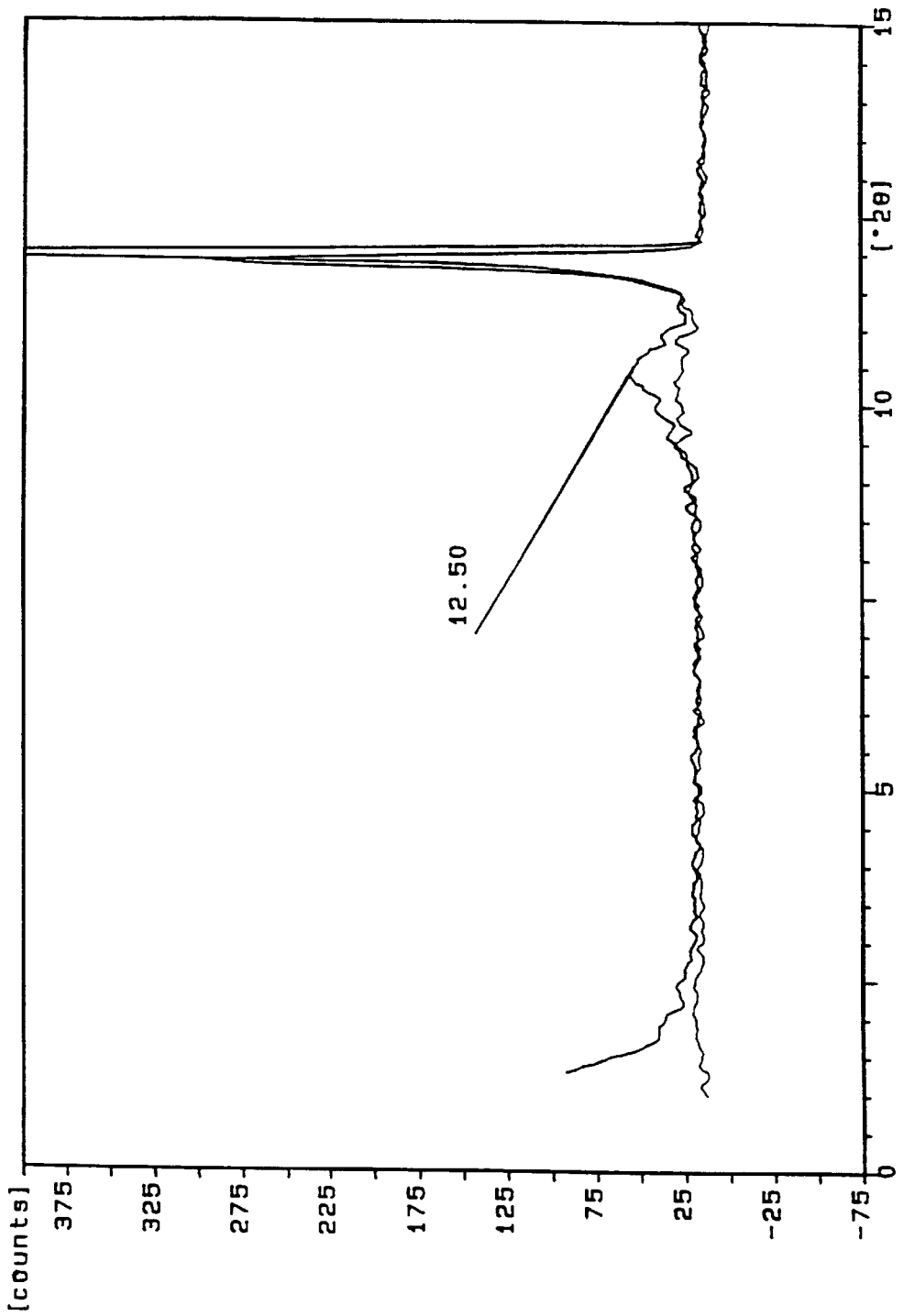
FIG. 12 is an x-ray diffraction pattern for the 70:30 mechanical blend of DMTPh:clay shown in FIG. 11, after heating the blend to above the melt temperature of the DMTPh (about 230° C.), showing the disappearance of the characteristic smectite clay d(001) peak (about 12.4 Å) for the melt, showing exfoliation, and a DMTPh:clay complex (intercalate) peak at about 12.5 Å; and an x-ray diffraction pattern for 100% DMTPh.

Similar to FIG. 9, the x-ray diffraction pattern shown in FIG. 11 was taken from a mechanical blend of 70% by weight dimethylterephthalate and 30% by weight sodium bentonite clay. Because of the different scales of FIG. 3 versus FIG. 9, the d(001) smectite peak at about 12.4 Å is not as high. The lower x-ray diffraction pattern of FIG. 11 is from 100% dimethylterephthalate. As shown in FIG. 12, when the mechanical blend was subjected to a temperature above the dimethylterephthalate melt temperature, about 230° C., the d(001) 12.4 Å smectite peak disappeared since the clay was intercalated with the polymer and exfoliated (lower pattern), while it appears for the mechanical blend (upper pattern).

EXAMPLE 5

Figure 13:
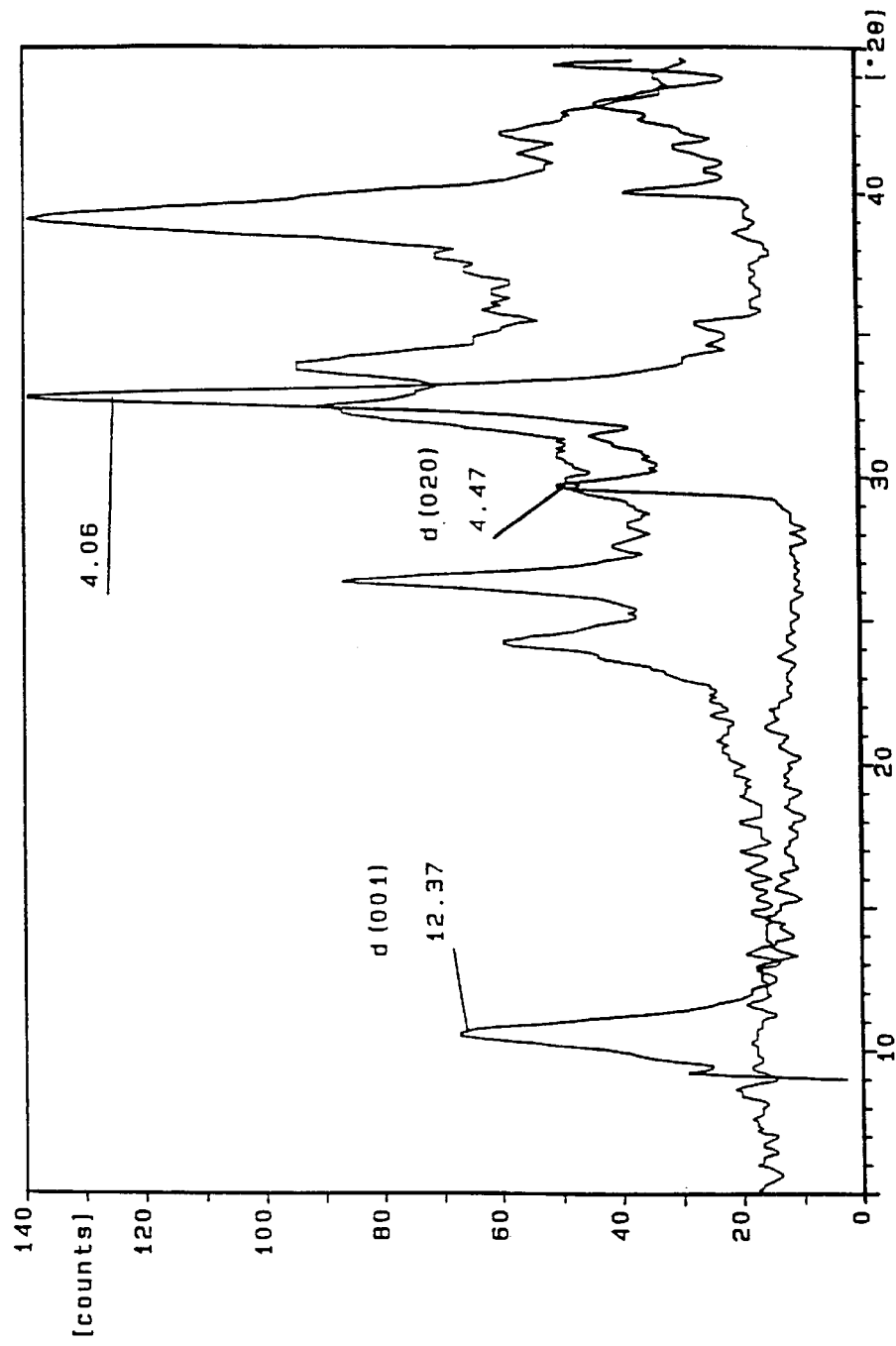
FIG. 13 is an x-ray diffraction pattern for a 230° C. melt (complex) of polyethyleneterephthalate (PET):sodium montmorillonite clay at a weight ratio of PET:clay of 90:10 (upper pattern) showing the disappearance of the characteristic smectite d(001) peak at about 12.4 Åfor the melt, showing exfoliation; and an x-ray diffraction pattern for ≈100% sodium bentonite, having a crystobalite impurity, (lower pattern)

The upper x-ray diffraction pattern of FIG. 13 was taken from a melt of 90% by weight polyethylene terephthalate (PET) and 10% by weight sodium bentonite clay (containing about 8% by weight moisture). The lower pattern was taken from 100% sodium bentonite, showing the characteristic smectite d(001) peak at about 12.4 (12.37) Å, and the characteristic d(020) peak at 4.47 Å. When heated to the PET melt temperature (upper x-ray diffraction pattern), the d(001) smectite peak disappeared since the PET was intercalated between the clay platelets and the platelets were exfoliated.

EXAMPLE 6

Figure 14:
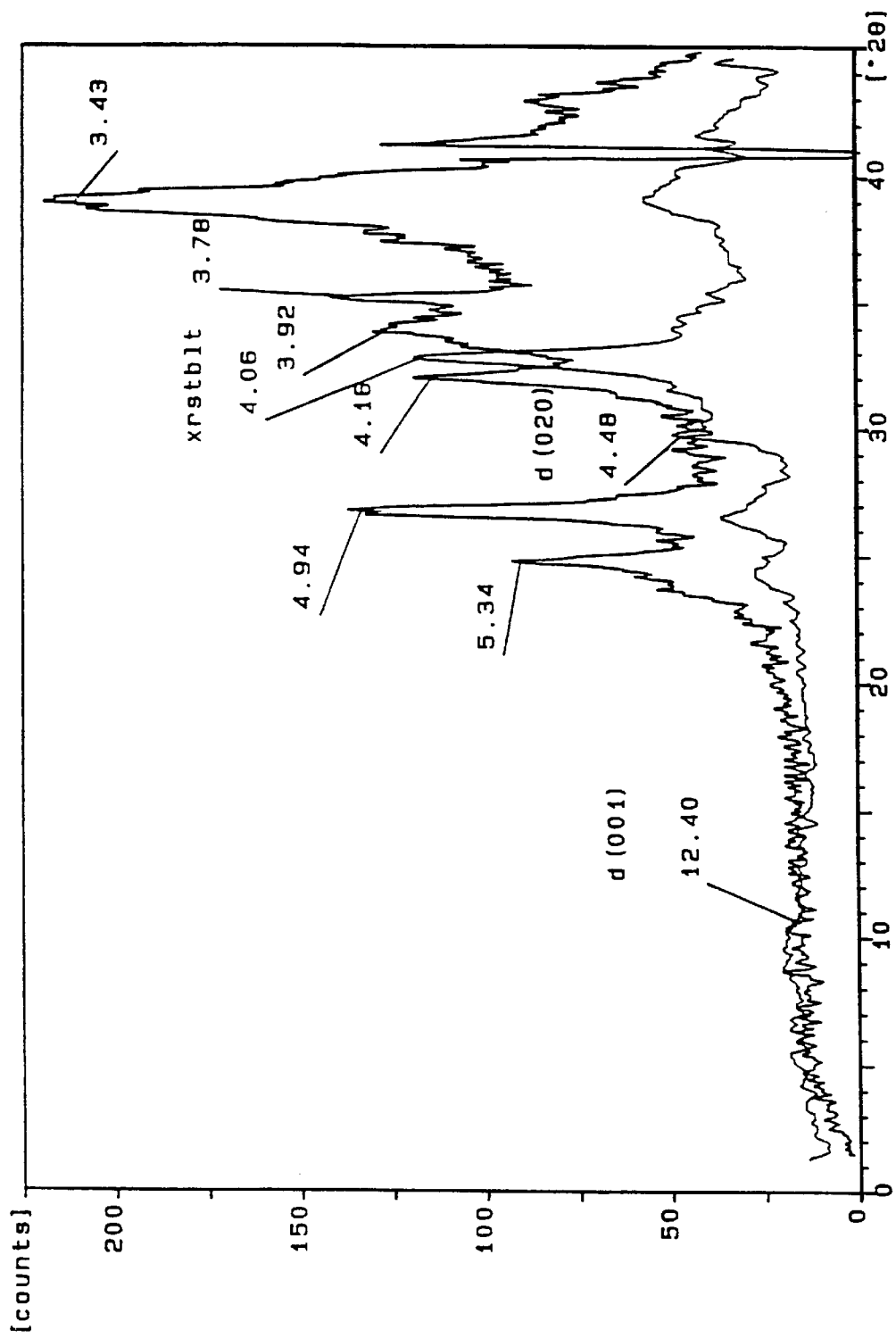
FIG. 14 is an x-ray diffraction pattern for a 250° C. melt (complex) of hydroxyethylterephthalate (HETPh):sodium montmorillonite clay at a weight ratio of HETPh:clay of 60:40 (lower pattern) showing the disappearance of the characteristic smectite d(001) peak at about 12.4 Åfor the melt, showing exfoliation; and an x-ray diffraction pattern for 100% HETPh (upper pattern)

FIG. 14 shows x-ray diffraction patterns from a melted (250° C.) blend of 60% by weight hydroxyethylterephthalate (HETPh) and 40% by weight sodium bentonite (containing about 8% by weight moisture), for the lower pattern, and 100% HETPh for the upper pattern. As shown, no characteristic smectite d(001) peak appears at about 12.4 Å for the melted blend while there is the characteristic d(020) peak at about 4.48 Å, indicating that the clay was intercalated with the HETPh, and the platelets were exfoliated.

EXAMPLE 7

Figure 15:
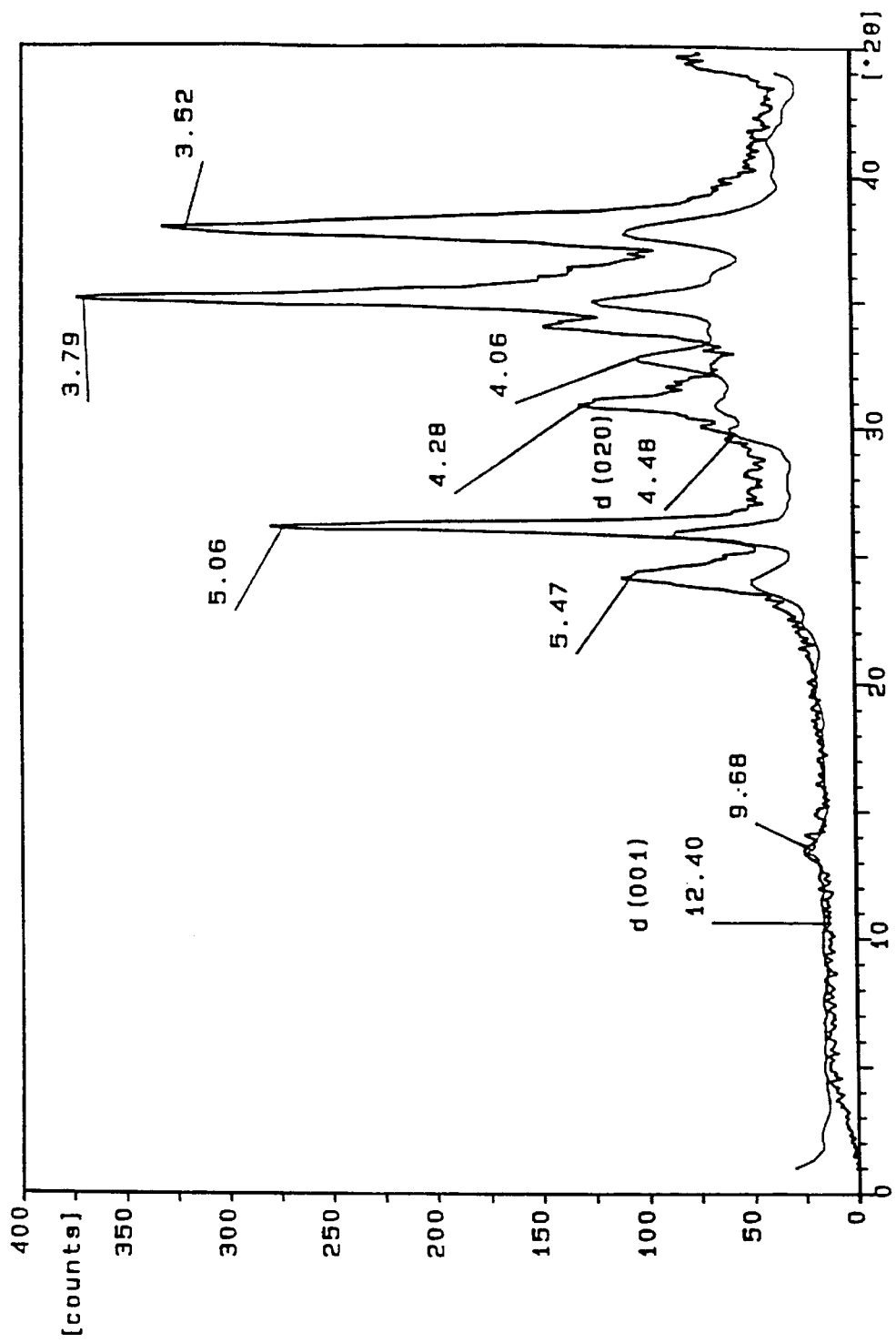
FIG. 15 is an x-ray diffraction pattern for 250° C. melt (complex) of hydroxybutylterephthalate (HBTPh):sodium montmorillonite clay at a weight ratio of HBTPh:clay of 70:30 (lower pattern) showing the disappearance of the characteristic smectite clay d(001) peak at about 12.4 Å for the melt, showing exfoliation; and an x-ray diffraction pattern for 100% HBTPh (lower pattern)

FIG. 15 shows x-ray diffraction patterns from a melted (250° C.) blend of 70% by weight hydroxybutylterephthalate (HBTPh) and 30% sodium bentonite (containing about 8% by weight moisture). As shown, no characteristic smectite d(001) peak appears at about 12.4 Å for the melted blend, indicating that the clay was intercalated with the HBTPh, and the platelets were exfoliated.

EXAMPLE 8

Figure 16:
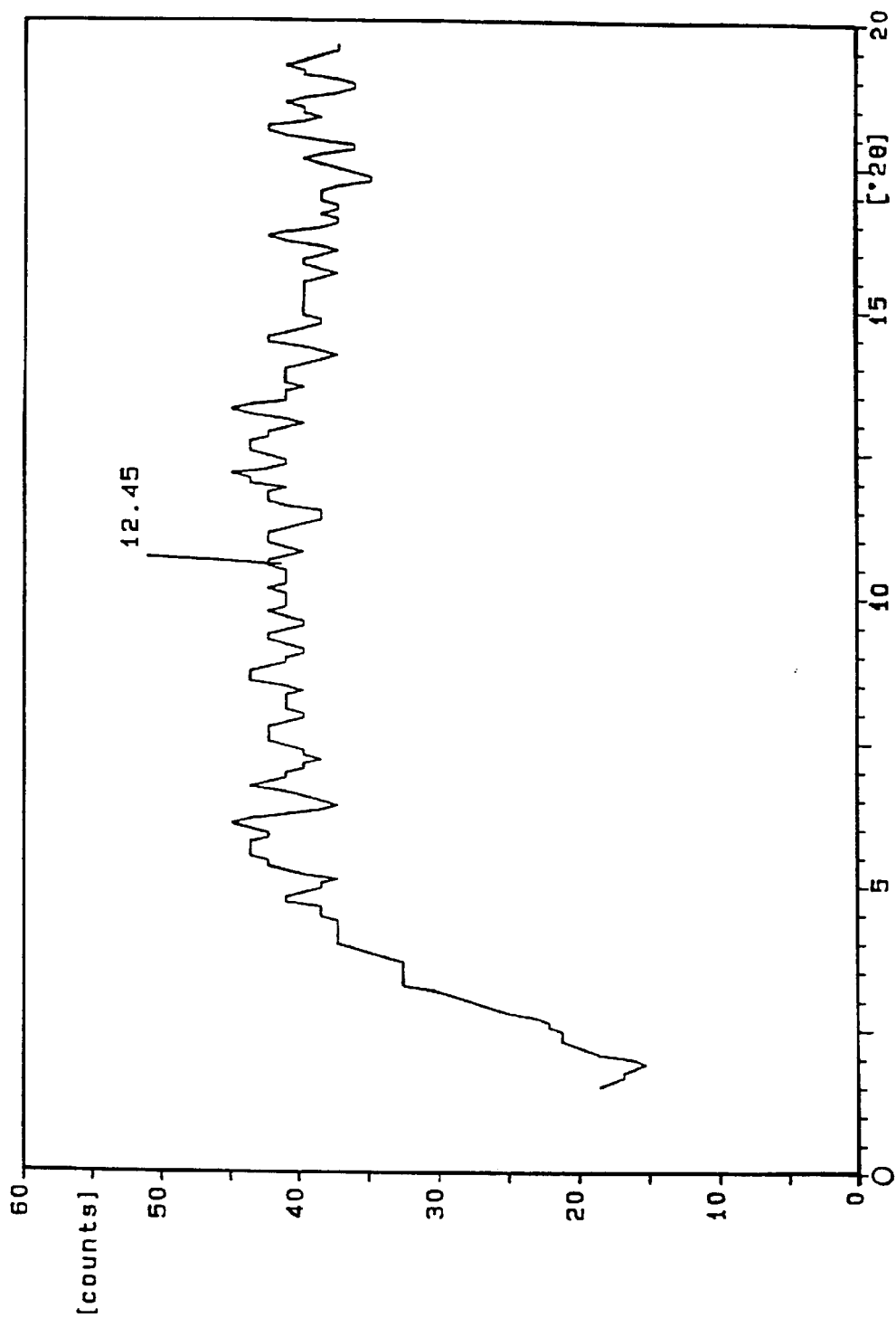
FIG. 16 is an x-ray diffraction pattern for a polycarbonate:sodium montmorillonite clay complex at a melted blend (280° C.) ratio of polycarbonate:clay of 50:50, showing the disappearance of the characteristic smectite d(001) peak at about 12.4 Å for the melt, showing exfoliation.

FIG. 16 shows an x-ray diffraction pattern from a melted (280° C.) blend of 50% by weight polycarbonate and 50% by weight sodium bentonite (containing about 8% by weight moisture). As shown, no characteristic smectite d(001) peak appears at about 12.4 Å for the melted blend, indicating that the clay was intercalated with the polycarbonate, and the platelets were exfoliated.

Figure 17:
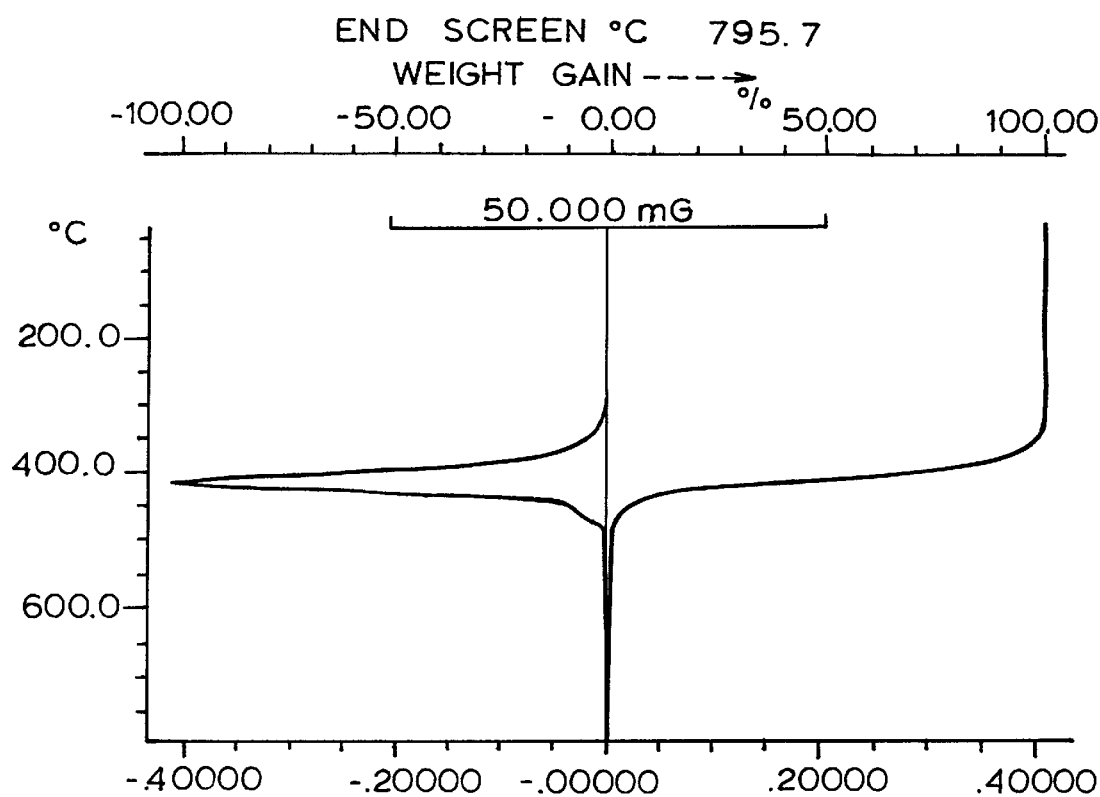
FIG. 17 is a thermogravimetric analysis of 50.0 milligrams of an ethylene vinyl alcohol (EVOH) copolymer, without the addition of a phyllosilicate, analyzed from a start temperature of 296.7° C., a peak temperature of 415.0° C., and an end temperature of 641.7° C., showing no decomposition peaks (no EVOH degradation)
Figure 18:
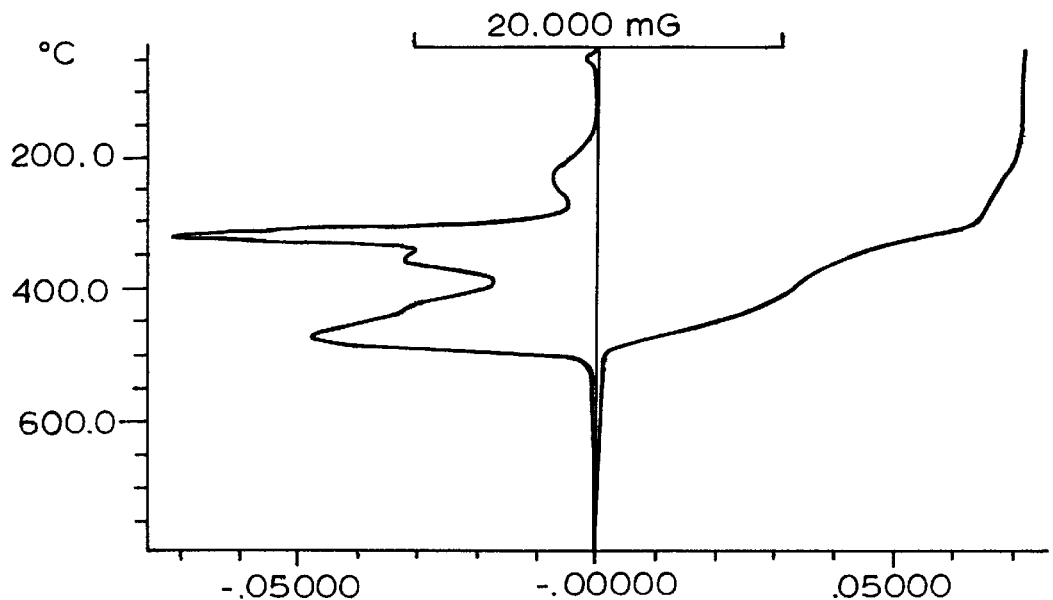
FIG. 18 is a thermogravimetric analysis of 20.0 milligrams total of the same ethylene vinyl alcohol copolymer of FIG. 17, complexed to a sodium montmorillonite clay—the complex then is incorporated into an EVOH matrix polymer at a loading of 9.2% by weight—analyzed through a start temperature of 36.7° C. and an end temperature of 690° C., showing decomposition peaks at about 357° C. and 472° C., indicating a great deal of EVOH polymer degradation.
Figure 19:
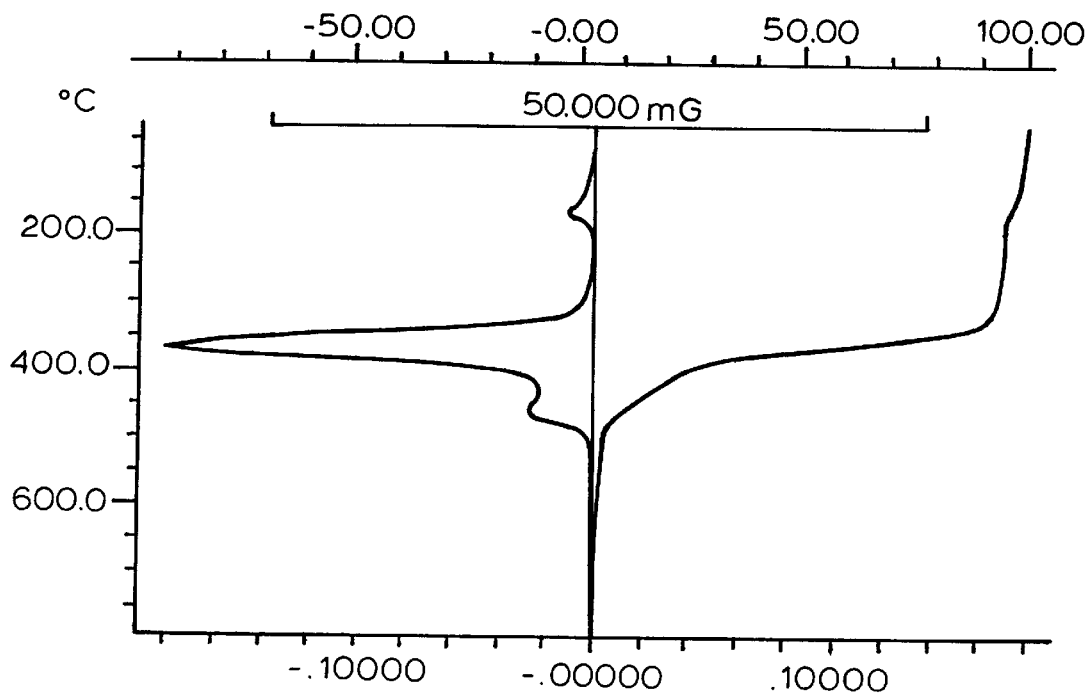
FIG. 19 is a thermogravimetric analysis of 50.0 milligrams total of polyvinyl alcohol (PVOH), complexed to the same sodium montmorillonite clay used in the analysis shown in FIG. 18—the complex then is incorporated into an EVOH matrix polymer at a loading of 4.29% by weight—analyzed through a start temperature of 46.7° C. and an end temperature of 768.3° C., showing no decomposition of PVOH.
Figure 20:
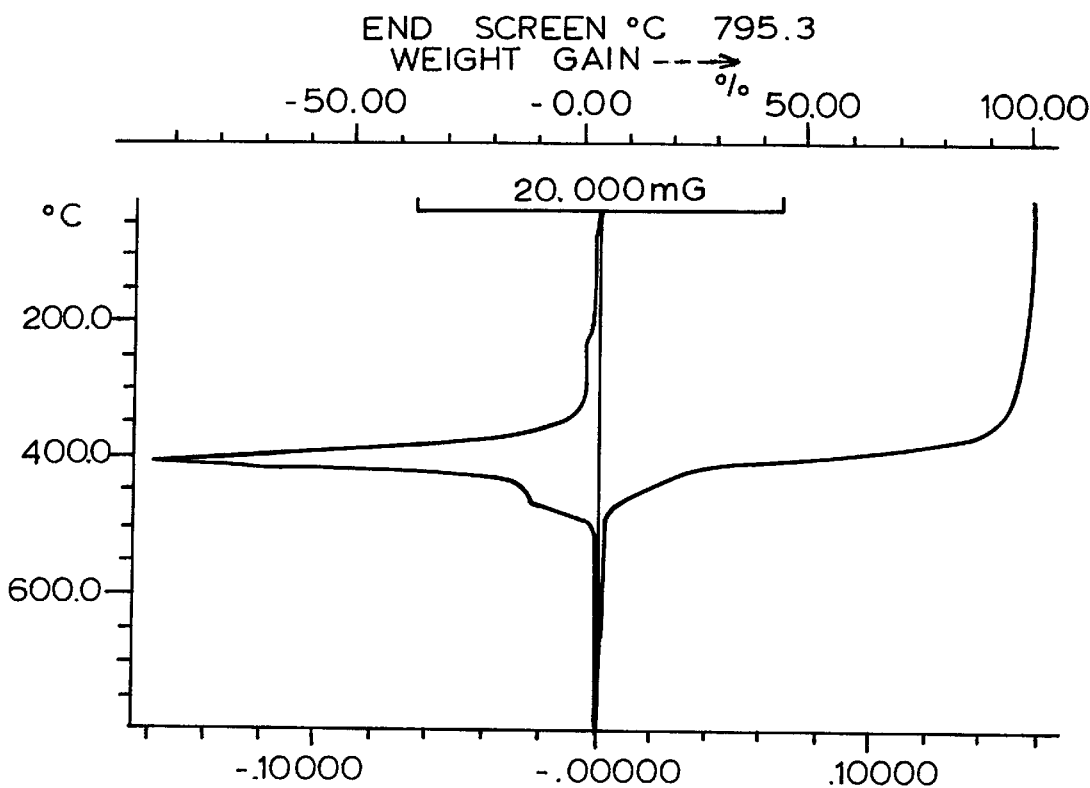
FIG. 20 is a thermogravimetric analysis of 20.0 milligrams total of polyvinylpyrrolidone (PVP), complexed to the same sodium montmorillonite clay used in the analyses shown in FIGS. 18 and 19—the complex then is incorporated into an EVOH matrix polymer at a loading of 3.9% by weight—analyzed through a start temperature of 153.3° C. and an end temperature of 715.0° C., showing no decomposition of PVP.
Figure 21:
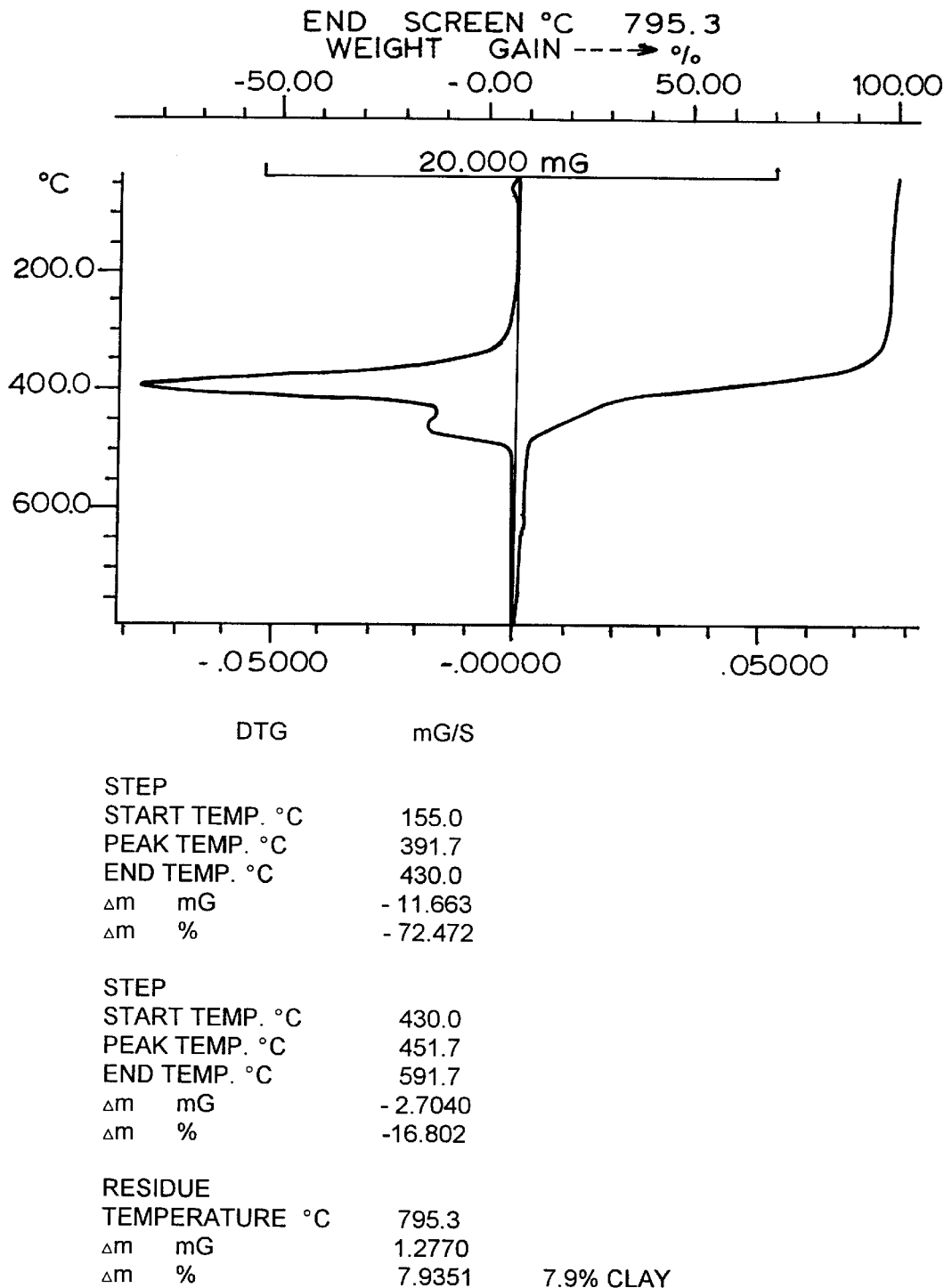
FIG. 21 is a thermogravimetric analysis of 20.0 milligrams total of a polyvinylpyrrolidone/polyvinyl acetate copolymer, complexed to the same sodium montmorillonite clay used in the analyses shown in FIGS. 18, 19 and 20—the complex then is incorporated into an EVOH matrix polymer at a loading of 7.9% by weight—analyzed through a start temperature of 155.0° C. and an end temperature of 591.7° C., showing no decomposition of the polyvinylpyrrolidone/polyvinyl acetate copolymer.

The thermogravimetric analysis graph of FIG. 18, in comparison to FIG. 17, shows that EVOH complexed to a sodium montmorillonite clay— the complex then added to an EVOH matrix polymer—results in substantial decomposition of the complexed EVOH. However, by complexing the clay with a non-EVOH intercalant (FIGS. 19, 20 and 21), the complexed clay platelets can be added to an EVOH matrix polymer without intercalant decomposition, and without degrading the EVOH matrix polymer.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A composite material comprising an ethylene vinyl alcohol copolymer in an amount of about 40% to about 99.95% by weight of the composite material, and about 0.05% to about 60% by weight exfoliated platelets of a phyllosilicate material, said platelets derived from an intercalate formed by contacting a phyllosilicate with a non-ethylene vinyl alcohol intercalant in an intercalating composition, said intercalant selected from the group consisting of a polymerizable monomer, oligomer and polymer, said composition having a concentration of said intercalant of at least about 2% by weight intercalant, to achieve sorption of and complexing of the intercalant to an inner platelet surface by a mechanism selected from the group consisting of ionic complexing; electrostatic complexing; chelation; hydrogen bonding; ion-dipole; dipole/dipole; Van Der Walls forces; and any combination thereof between adjacent spaced layers of the phyllosilicate, without an onium ion or silane coupling agent, to expand the spacing between a predominance of the adjacent phyllosilicate platelets to at least about 5 Å, when measured after sorption of the intercalant.

2. A composite material in accordance with claim 1, wherein the concentration of intercalant in said phyllosilicate-contacting composition is at least about 5% by weight.

3. A composite material in accordance with claim 2, wherein the concentration of intercalant in said phyllosilicate-contacting composition is at least about 15% by weight.

4. A composite material in accordance with claim 3, wherein the concentration of intercalant in said phyllosilicate-contacting composition is at least about 20% by weight.

5. A composite material in accordance with claim 4, wherein the concentration of intercalant in said phyllosilicate-contacting composition is at least about 30% by weight.

6. A composite material in accordance with claim 5, wherein the concentration of intercalant in said phyllosilicate-contacting composition in the range of about 50% to about 80% by weight.

7. A composite material in accordance with claim 5, wherein the concentration of intercalant in said phyllosilicate-contacting composition in the range of about 50% to about 100% by weight.

8. A composite material in accordance with claim 1, wherein the concentration of intercalant in the phyllosilicate-contacting composition is initially at least about 16% by weight, based on the dry weight of the phyllosilicate contacted.

9. A composite material in accordance with claim 8, wherein the concentration of intercalant in the phyllosilicate-contacting composition is initially in the range of about 16% to about 70% by weight, based on the dry weight of the phyllosilicate contacted.

10. A composite material in accordance with claim 9, wherein the concentration of intercalant in the phyllosilicate-contacting composition is initially in the range of about 16% to less than about 35% by weight, based on the dry weight of the phyllosilicate contacted.

11. A composite material in accordance with claim 9, wherein the concentration of intercalant in the phyllosilicate-contacting composition is initially in the range of about 35% to less than about 55% by weight, based on the dry weight of the phyllosilicate contacted.

12. A composite material in accordance with claim 9, wherein the concentration of the intercalant in the phyllosilicate-contacting composition is 70% by weight, based on the dry weight of the phyllosilicate contacted.

13. A composite material in accordance with claim 1, wherein the intercalant is selected from the group consisting of polyvinyl pyrrolidone; polyvinyl alcohol; polyvinyl acetate/polyvinylpyrrolidone copolymers and mixtures thereof.

14. A composite material in accordance with claim 13, wherein the intercalant is polyvinyl alcohol having less than about 5% by weight acetal substituents.

15. A composite material in accordance with claim 14, wherein the intercalant is polyvinyl alcohol having less than about 1% by weight acetal substituents.

16. A composite material in accordance with claim 1, wherein the intercalant is selected from the group consisting of N-methylpyrrolidone, N-ethylpyrrolidone, N-vinylpyrrolidone, and mixtures thereof.

17. A composite material in accordance with claim 1, wherein the intercalant has a weight average molecular weight in the range of about 225 to about 1,000,000.

18. A composite material in accordance with claim 17, wherein the intercalant has a weight average molecular weight in the range of about 225 to about 10,000.

19. A method of manufacturing a composite material containing about 40% to about 99.95% by weight of an EVOH matrix polymer, and about 0.05% to about 60% by weight of exfoliated platelets of a phyllosilicate material, said platelets derived from an intercalated phyllosilicate having an intercalant intercalated between adjacent phyllosilicate platelets comprising:

contacting the phyllosilicate with a non-EVOH intercalant-containing composition comprising at least about 5% by weight of said intercalant, to achieve intercalation of said intercalant between said adjacent phyllosilicate platelets in an amount sufficient to space said adjacent phyllosilicate platelets a distance of at least about 5 Å;

combining the intercalated platelets with said EVOH polymer, and heating the polymer sufficiently to provide for flow of said polymer and delamination of the platelets of said phyllosilicate; and dispersing said delaminated platelets throughout said EVOH matrix polymer.

20. The method of claim 19, wherein said intercalant-containing composition includes a carrier comprising about 5% to about 95% by weight organic solvent, based on the total weight of said composition contacting said phyllosilicate.

21. The method of claim 20, wherein said carrier comprises about 5% to about 95% of an aliphatic alcohol.

22. The method of claim 21, wherein said alcohol is selected from the group consisting of methanol, ethanol, and mixtures thereof.

23. A method of manufacturing a composite material comprising an EVOH matrix polymer and exfoliate platelets of a phyllosilicate comprising:

contacting the phyllosilicate, having a moisture content of at least about 4% by weight, with an intercalating composition comprising at least about 2% by weight of a non-EVOH intercalant in a liquid carrier, to achieve intercalation of said intercalant between said adjacent phyllosilicate platelets in an amount sufficient to space said adjacent phyllosilicate platelets a distance of at least about 5 Å;

separating the platelets of the intercalated phyllosilicate; and combining said platelets with the EVOH matrix polymer.

24. The method of claim 23, wherein said intercalant-containing composition includes a liquid carrier capable of solubilizing the intercalant, in an amount of about 5% to about 95% by weight, based on the total weight of said intercalating composition.

25. The method of claim 24, wherein said carrier comprises about 30% to about 40% by weight water, based on the total weight of the intercalating composition.

26. The method of claim 25, wherein said liquid carrier comprises about 35% to about 40% by weight water.

27. The method of claim 24, wherein said carrier comprises about 5% to about 50% by weight water, based on the total weight of the intercalating composition.

28. A composite material comprising an EVOH matrix polymer in an amount of about 40% to about 99.95% by weight of the composite material, and about 0.05% to about 60% by weight exfoliated platelets of a phyllosilicate material, said platelets derived from an intercalate formed by contacting a phyllosilicate, having a water content of at least about 4% by weight, with a non-EVOH intercalant to form an intercalating composition, thereby achieving sorption of the intercalant between adjacent spaced layers of the phyllosilicate to expand the spacing between a predominance of the adjacent phyllosilicate platelets to at least about 10 Å, when measured after sorption of the intercalant, and thereafter exfoliating the intercalate into a predominance of single platelets.

29. The method of claim 28, wherein the phyllosilicate is contacted with said intercalant in the form of a composition comprising an intercalant and water, and wherein the concentration of intercalant in said intercalating composition is at least about 8% by weight, based on the dry weight of the phyllosilicate.

* * * * *

UNITED STATES PATENT AND TRADEMARK OFFICE
CERTIFICATE OF CORRECTION

| | | |
|---|---|---|
| PATENT NO. | : 5,844,032 | Page 1 of 1 |
| APPLICATION NO. | : 08/761444 | |
| DATED | : December 1, 1998 | |
| INVENTOR(S) | : Serrano et al. | |

It is certified that error appears in the above-identified patent and that said Letters Patent is hereby corrected as shown below:

Title Page, Other Publications, second column, article missing in PTO's version: add citation C26, -- T. Lan et al., "Clay-Epoxy Nanocomposites: Relationships Between Reinforcement Properties And the Extend Of Clay Layer Exfoliation", Polym. Mater. Sci. Eng., Vol. 73, 296-297 (1995). --

Title Page, Foreign Patent Documents, second column, patent missing on PTO's version; add -- WO 93/11190  6/1993  WIPO --.

Signed and Sealed this

Twenty-ninth Day of January, 2008

JON W. DUDAS
*Director of the United States Patent and Trademark Office*